(12) United States Patent
Leem et al.

(10) Patent No.: US 11,076,263 B2
(45) Date of Patent: Jul. 27, 2021

(54) ELECTRONIC DEVICE FOR PROVIDING LOCATION INFORMATION AND CONTROL METHOD THEREFOR

(71) Applicant: Samsung Electronics Co., Ltd., Gyeonggi-do (KR)

(72) Inventors: Han-Sung Leem, Gyeonggi-do (KR); Hye-Jeong Kim, Gyeonggi-do (KR); Jong-Min Baik, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/644,572

(22) PCT Filed: Sep. 18, 2018

(86) PCT No.: PCT/KR2018/010992
§ 371 (c)(1),
(2) Date: Mar. 5, 2020

(87) PCT Pub. No.: WO2019/059615
PCT Pub. Date: Mar. 28, 2019

(65) Prior Publication Data
US 2021/0067912 A1   Mar. 4, 2021

(30) Foreign Application Priority Data

Sep. 25, 2017  (KR) .................. 10-2017-0123798

(51) Int. Cl.
*H04W 4/02* (2018.01)
*H04W 4/029* (2018.01)
(Continued)

(52) U.S. Cl.
CPC .......... *H04W 4/029* (2018.02); *G08B 21/182* (2013.01); *H04W 4/023* (2013.01); *H04W 4/70* (2018.02)

(58) Field of Classification Search
CPC ....... H04W 4/02; H04W 4/021; H04W 4/023; H04W 4/025; H04W 4/029; H04W 4/70; H04W 52/00; H04W 52/02; G08B 21/182
See application file for complete search history.

(56) References Cited

U.S. PATENT DOCUMENTS

2013/0210420 A1   8/2013   Deivasigamani et al.
2015/0134761 A1   5/2015   Sharma et al.
(Continued)

FOREIGN PATENT DOCUMENTS

KR   10-2010-0015026 A   2/2010
KR   10-2011-0023793 A   3/2011
(Continued)

*Primary Examiner* — Siu M Lee
(74) *Attorney, Agent, or Firm* — Cha & Reiter, LLC

(57) ABSTRACT

Disclosed are an electronic device for providing location information and a control method therefor. An electronic device according to various embodiments of the present document may comprise: a communication module; a processor operably connected to the communication module; and a memory operably connected to the processor, wherein: the memory includes instructions that, when executed, cause the processor to receive, from a second electronic device, a first identification request for identification of the location of a first electronic device, transmit the received first identification request to the first electronic device, determine whether a first identification response corresponding to the transmitted first identification request is received from the first electronic device, and transmit first location information of the first electronic device, stored in the memory, to the second electronic device on the basis of the determination; and the first location information includes location information transmitted by the first electronic device according to a second identification request received from the second electronic device before a time point at which the first identification request is received.

20 Claims, 24 Drawing Sheets

(51) Int. Cl.
*H04W 4/70* (2018.01)
*G08B 21/18* (2006.01)

(56) References Cited

U.S. PATENT DOCUMENTS

2017/0208564 A1   7/2017  Lee et al.
2018/0176879 A1*  6/2018  Yoon .................... H04W 64/003
2019/0098579 A1*  3/2019  Cha ....................... H04W 4/025

FOREIGN PATENT DOCUMENTS

| KR | 10-2014-0023773 A | 2/2014 |
| KR | 10-2014-0112067 A | 9/2014 |
| KR | 10-1453248 B1 | 10/2014 |
| KR | 10-2017-0032304 A | 3/2017 |
| KR | 10-2017-0085806 A | 7/2017 |

* cited by examiner

ELECTRONIC DEVICE FOR PROVIDING LOCATION INFORMATION AND CONTROL METHOD THEREFOR

CROSS-REFERENCE TO RELATED APPLICATION(S)

This application is a National Phase Entry under 35 U.S.C. § 371 of PCT International Application No. PCT/KR2018/010992, which was filed on Sep. 18, 2018, and claims priority to Korean Patent Application No. 10-2017-0123798, which was filed in the Korean Intellectual Property Office on Sep. 25, 2017, the entire contents of each of which are incorporated herein by reference.

BACKGROUND

1. Field

The disclosure generally relates to an electronic device for providing location information and a method of controlling the same.

2. Description of the Related Art

Recently, according to the rapid growth of a mobile communication environment, portable electronic devices such as smart phones have been widely supplied and the supply of IoT devices has significantly increased. According to a change in the mobile communication environment, it is required to develop a technology for processing rapidly increasing data transmission/reception of an IoT device.

In general, the IoT device requires low power consumption and stable network connection. Accordingly, when the IoT device is used through the application of the conventional LTE or LTE-Advanced communication scheme, unnecessary power consumption may increase. In order to prevent the increase in unnecessary power consumption, a Low-Power Wide-Area (LPWA) technology is being developed.

SUMMARY

According to the conventional IoT device for providing a location tracking function, when the IoT device receives a location information request for providing information related to the current location of the IoT device, the location information may be provided to an external electronic device (for example, a smart phone connected to the IoT device) according to the request even though there is no change in the location of the IoT device for a specific time. However, such a function/operation of the conventional IoT device may consume much power even when executed in low power wide area communication, for example, NB-IoT communication.

Various embodiments of the disclosure may provide an electronic device capable of, when there is no change in the location of the IoT device for a specific time, reducing power consumption generated due to a response by not transmitting the response to a request even though a location information request is received.

Various embodiments of the disclosure may provide an electronic device capable of, when there is no change in the location of the IoT device for a specific time, reducing power consumption generated due to monitoring of the location information request and the response to the location information request by not monitoring the location information request.

Various embodiments of the disclosure may provide an electronic device capable of, when an external electronic device (for example, a server) does not receive the response to the location information request from the IoT device within a predetermined time, transmitting location information and/or time information of the IoT device to an electronic device (for example, a smart phone) transmitting the location information request through the external electronic device.

In accordance with an aspect of the disclosure, a system is provided. The system includes: a communication module; a processor operatively connected to the communication module; and a memory operatively connected to the processor, wherein the memory includes instructions causing the processor to, when executed, receive a first identification request for identifying a location of a first electronic device from a second electronic device through the communication module, transmit the received first identification request to the first electronic device through the communication module, determine whether a first identification response corresponding to the transmitted first identification request is received from the first electronic device, and transmit first location information of the first electronic device stored in the memory to the second electronic device through the communication module on the basis of the determination, and the first location information includes location information transmitted from the first electronic device according to a second identification request received from the second electronic device before a time point at which the first identification request is received.

In accordance with another aspect of the disclosure, a computer-readable recording medium storing instructions configured to cause a processor to perform at least one operation is provided. The at least one operation may include: receiving a first identification request for identifying a location of a first electronic device from a second electronic device; transmitting the received first identification request to the first electronic device; determining whether a first identification response corresponding to the transmitted first identification request is received from the first electronic device; and transmitting first location information of the first electronic device stored in the memory to the second electronic device on the basis of the determination, wherein the first location information includes location information transmitted from the first electronic device according to a second identification request received from the second electronic device before a time point at which the first identification request is received.

In accordance with another aspect of the disclosure, an electronic device is provided. The electronic device includes: a housing; a communication module located within the housing; a processor located within the housing and connected to the communication module to be operable; and at least one memory located within the housing and connected to the processor to be operable, wherein the memory includes instructions causing the processor to, when executed, receive a request for providing information related to a current location of the electronic device from an external electronic device in a first operation mode through the communication module by the electronic device, acquire the information related to the current location through the communication module, based on the received request, determine whether the electronic device moves on the basis of the acquired information, and switch to a second operation mode on the basis of determination of whether the electronic device moves.

According to various embodiments of the disclosure, when there is no change in the location of an IoT device for a specific time, a response to a request is not transmitted even though a location information request is received, and thus an effect of reducing power consumption generated due to the response may be created.

According to various embodiments of the disclosure, when there is no change in the location of an IoT device for a specific time, a location information request is not monitored, and thus an effect of reducing power consumption generated due to the monitoring of the location information request and a response to the location information request may be created.

According to various embodiments of the disclosure, location information acquired at a specific time point is transmitted to an electronic device transmitting a location information request even though a response to the location information request is not received from the IoT device, and thus an effect of reducing power consumption of the IoT device and increasing user convenience can be obtained.

Effects according to various embodiments of the disclosure are not limited to the above-described effects, and it is apparent to those skilled in the art that various effects are included in the disclosure.

DETAILED DESCRIPTION

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the disclosure. Further, the term "and/or" may include any one or any combination of a plurality of mentioned items.

Figure 1:
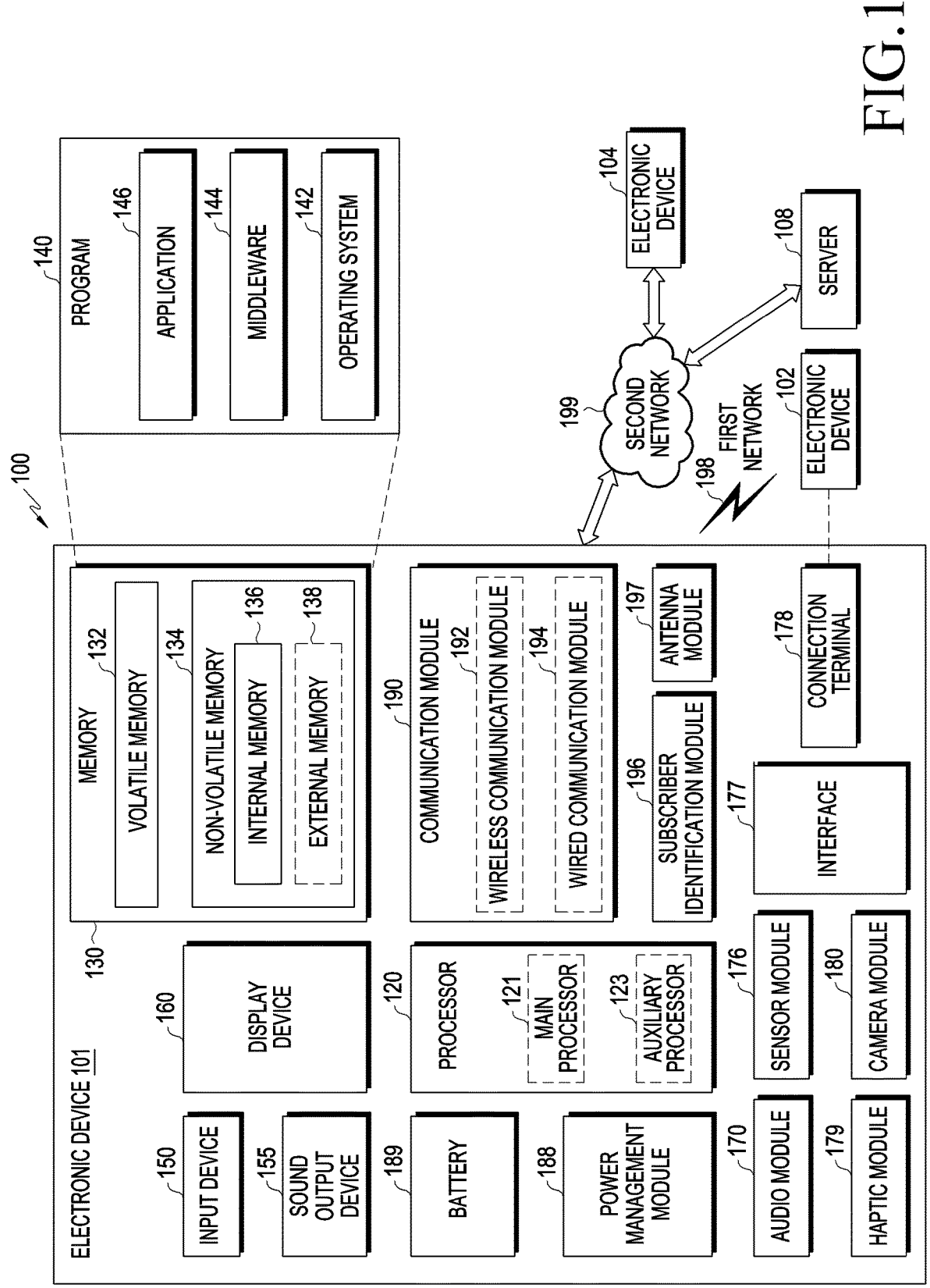
FIG. 1 is a block diagram illustrating an electronic device within a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
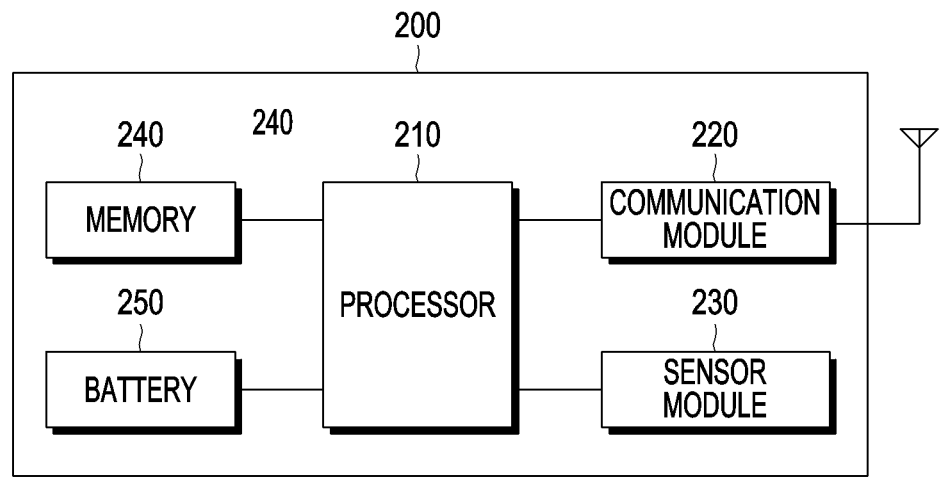
FIGS. 2A and 2B are block diagrams of an electronic device according to various embodiments.
Figure 2B:
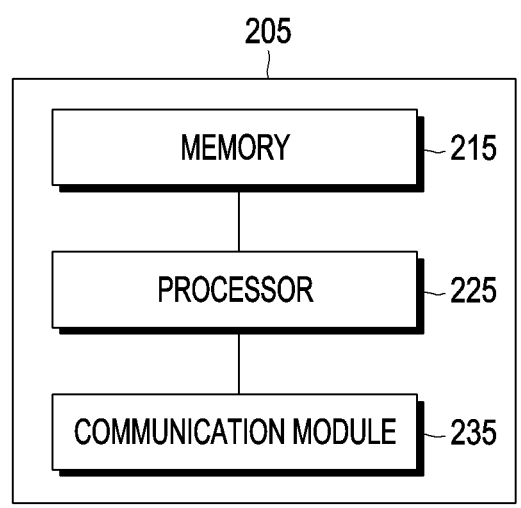

FIGS. 2A and 2B are block diagrams of an electronic device according to various embodiments.

Referring to FIG. 2A, an electronic device 200 according to various embodiments of the disclosure may include a processor 210, a communication module 220, a sensor module 230, a memory 240, and a battery 250.

The processor 210 according to various embodiments of the disclosure may control one at least one different element (for example, a hardware or software element) of the electronic device 200 connected to the processor 210 by driving various software and performing various data processings and operations.

The communication module 220 according to various embodiments of the disclosure may establish a wireless communication channel or a wired communication channel with an external electronic device (for example, the electronic device 101 of FIG. 1) and support communication through the established communication channel. According to various embodiments of the disclosure, the communication module 220 may include a communication module for supporting low power wide area communication (for example, NB-IoT). According to various embodiments of the disclosure, the communication module 220 may include at least one of a cellular communication module, a short-range wireless communication module, a Global Navigation Satellite System (GNSS) communication module, a Local Area Network (LAN) communication module, and/or a power line communication module.

The sensor module 230 according to various embodiments of the disclosure may include sensors which are the same as or similar to the sensor module 176 described with reference to FIG. 1. For example, the sensor module 230 may include at least one of a gesture sensor, a gyro sensor, an atmospheric pressure sensor, a magnetic sensor, an acceleration sensor, a grip sensor, a proximity sensor, a color sensor, an Infrared (IR) sensor, a biometric sensor, a temperature sensor, a humidity sensor, an illumination sensor, and a gas sensor.

The memory 240 according to various embodiments of the disclosure may store various pieces of information related to the operation of the electronic device 200. For example, the memory 240 may store at least one piece of information on an access point which the electronic device 200 currently accesses, current location information, past location information, information on a time at which location information is acquired, and authentication information.

The battery 250 according to various embodiments of the disclosure is a device for supplying power to at least one element of the electronic device 200 and may include, for example, an unchargeable primary cell, a rechargeable secondary cell, or a fuel cell.

Referring to FIG. 2B, the electronic device 205 according to various embodiments of the disclosure may include a memory 215, a processor 225 operatively connected to the memory 215, and a communication module 235 operatively connected to the memory 215 and the processor 225.

The memory 215 according to various embodiments of the disclosure may store various pieces of information related to the operation of the electronic device 205. For example, the memory 215 may store at least one piece of current location information, past location information of an external electronic device (for example, the electronic device 200 of FIG. 2A), information on a time at which location information is acquired, and authentication information.

The processor 225 according to various embodiments of the disclosure may control one at least one different element (for example, a hardware or software element) of the electronic device 205 connected to the processor 225 by driving various software and performing various data processings and operations.

The communication module 235 according to various embodiments of the disclosure may establish a wireless communication channel or a wired communication channel with an external electronic device (for example, the electronic device 200 of FIG. 2A) and support communication through the established communication channel. According to various embodiments of the disclosure, the communication module 235 may include a communication module for supporting low power wide area communication (for example, NB-IoT). According to various embodiments of the disclosure, the communication module 235 may include at least one of a cellular communication module, a short-range wireless communication module, a global navigation satellite system (GNSS) communication module, a local area network (LAN) communication module, and/or a power line communication module.

Figure 3:
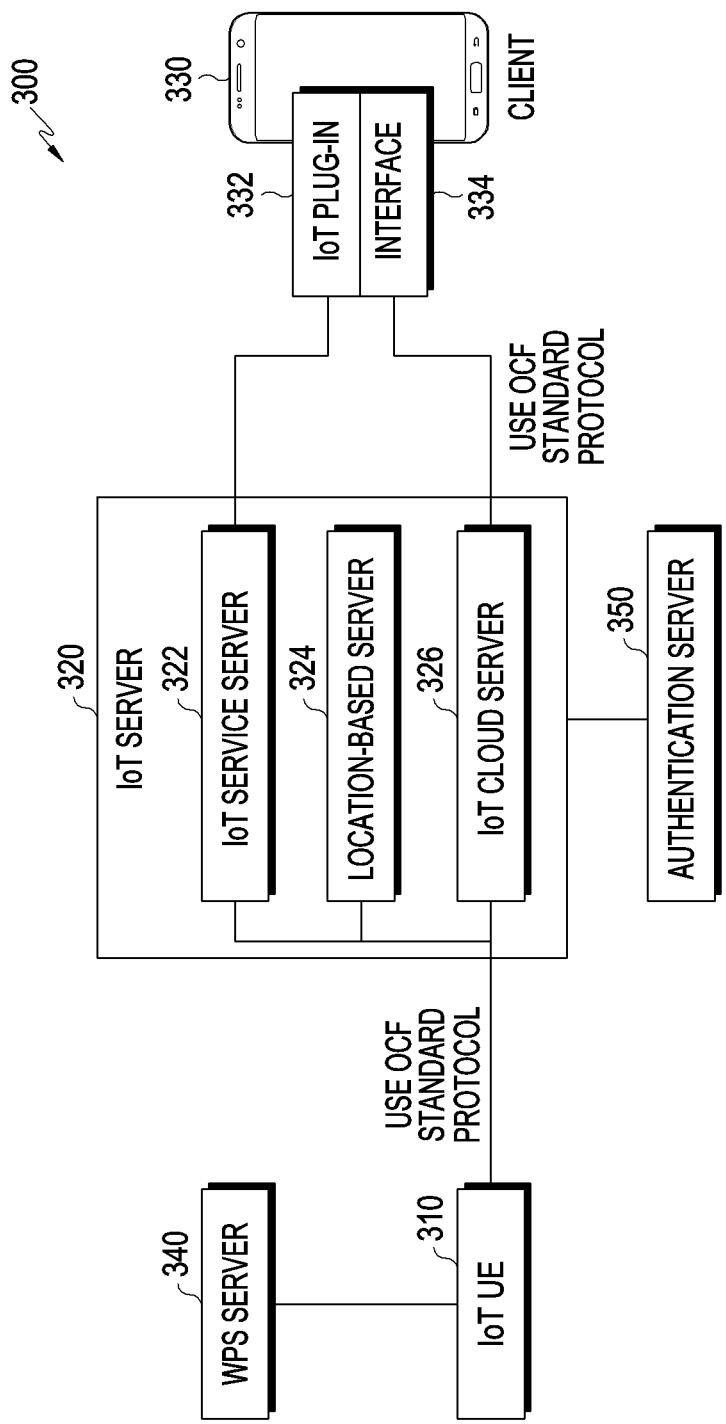
FIG. 3 illustrates a network environment according to various embodiments.

FIG. 3 illustrates a network environment according to various embodiments. According to various embodiments of the disclosure, the network environment may include a narrow band IoT network environment.

Referring to FIG. 3, the network 300 according to various embodiments of the disclosure may include an IoT UE 310, an IoT server 320, a client 330, a Wi-Fi Positioning System (WPS) server 340, and an authentication server 350.

The IoT UE 310 according to various embodiments of the disclosure may be connected to the IoT server 320 and/or the client 330 through low power wide area communication (for example, NB-IoT, RoLa, or SigFax). The IoT UE 310 according to various embodiments of the disclosure may be connected to the IoT server 320 through wireless communication or wired communication. For example, the wireless communication may include cellular communication, short-range wireless communication, or Global Navigation Satellite System (GNSS) communication. The wired communication may include Local Area Network (LAN) communication or power-line communication. The IoT UE 310 may include various types of devices. The IoT UE 310 according to various embodiments of the disclosure may include, for example, at least one of a computer device, a portable multimedia device, a camera, and a wearable device. The IoT UE 310 may be connected to the WPS server 340. The IoT UE 310 is connected to the WPS server 340 and may acquire current location information of the IoT UE 110310 through (or using) a WPS scheme. The IoT UE 310 may be connected to the IoT server 120320 through an Open Connectivity Foundation (OCF) standard protocol. According to various embodiments of the disclosure, the IoT UE 310 may acquire current location information of the IoT UE 310 through GNSS communication.

The IoT server 320 according to various embodiments of the disclosure may be connected to the IoT UE 310 and the client 330 through wireless communication or wired communication. The IoT server 320 may include an IoT service server 322, a location-based server 324, and an IoT cloud server 326. According to various embodiments of the disclosure, at least some of the IoT service server 322, the location-based server 324, and the IoT cloud server 326 may be integrated into a signal device. According to various embodiments of the disclosure, some of the IoT service server 322, the location-based server 324, and the IoT cloud server 326 may be omitted. The IoT service server 322 may store information related to a geo-fence for the IoT UE 310 or transmit the information related to the geo-fence to the IoT UE 310 and/or the client 330. The location-based server 324 may store information related to the location of the IoT UE 310 (for example, information for determining the current location of the IoT UE 310 such as coordinate information of the IoT UE 310 and information related to an access point to which the IoT UE 310 is connected) or transmit the information related to the location to the IoT UE 310 and/or the client 330. According to various embodiments of the disclosure, the location-based server 324 may store information on a time at which the information related to the location of the IoT UE 310 is acquired (for example, information of at least one group of information (year/month/date) or (hour/minute/second)) or transmit the information related to the location to the IoT UE 310 and/or the client 330. In the disclosure, for convenience of description, "information related to the location" may be briefly referred to as "location information". In the disclosure, for convenience of description, information on a time at which information related to the location of the IoT UE 310 is acquired may be briefly referred to as "time information". In some embodiments of the disclosure, the term "location information" may be used as a meaning which includes the time information.

The IoT cloud server 326 is connected to the authentication server 350 and may store authentication information (for example, user identification information for authentication and password configured for authentication) for mutual authentication between the IoT UE 310 and the client 330.

The client 330 according to various embodiments of the disclosure may be connected to the IoT server 320 through wireless communication or wired communication. An IoT plug-in 332 that is connected to the IoT server 320 to communicate therewith may be installed in the client 330. An interface (for example, Samsung® Connect™) for the authentication may be installed in the client 330. A user of the client 330 may perform the authentication with the IoT UE 310 through the interface 334.

The WPS server 340 according to various embodiments of the disclosure may be connected to the IoT UE 310 through wireless communication or wired communication. The WPS server 340 may receive a request for transmitting location information from the IoT UE 310. Upon receiving the request, the WPS server 340 may acquire information on an Access Point (AP) to which the IoT UE 310 is connected. The information on the access point (AP) may include at least some of a MAC address, a Service Set Identification (SSID), a Received Signal Strength Indicator (RSSI), a Reference Signal Received Power (RSRP), a Reference Signal Received Quality (RSRQ), channel information, a network type, a signal strength, and a noise strength. The information on the access point may be transmitted to the WPS server 340 from the IoT UE 310 or the access point (AP) to which the IoT UE 310 is connected. The WPS server 340 may search for an access point corresponding to the information on the access point in a pre-stored database on the basis of the acquired information on the access point (AP). The database may include various pieces of information such as a MAC address, an SSID, channel information, a network type, latitude/longitude coordinates of the access point, a name of a building at which the access point is located, a floor, an address of an owner of the access point, and a phone number. The WPS server 340 may determine that an access point found on the basis of the database is an access point to which the IoT UE 310 is currently connected. The WPS server 340 may acquire information corresponding to the determined access point from the database. The WPS server 340 may transmit the acquired information corresponding to the determined access point to the IoT UE 310.

The authentication server 350 according to various embodiments of the disclosure may be connected to the IoT server 320 through wireless communication or wired communication. The authentication server 350 may be operated by, for example, a provider who is the same as a provider of the interface 334. The authentication server 350 may store authentication information (for example, user identification information authentication and password configured for authentication) for mutual authentication between the IoT UE 310 and the client 330.

Figure 4:
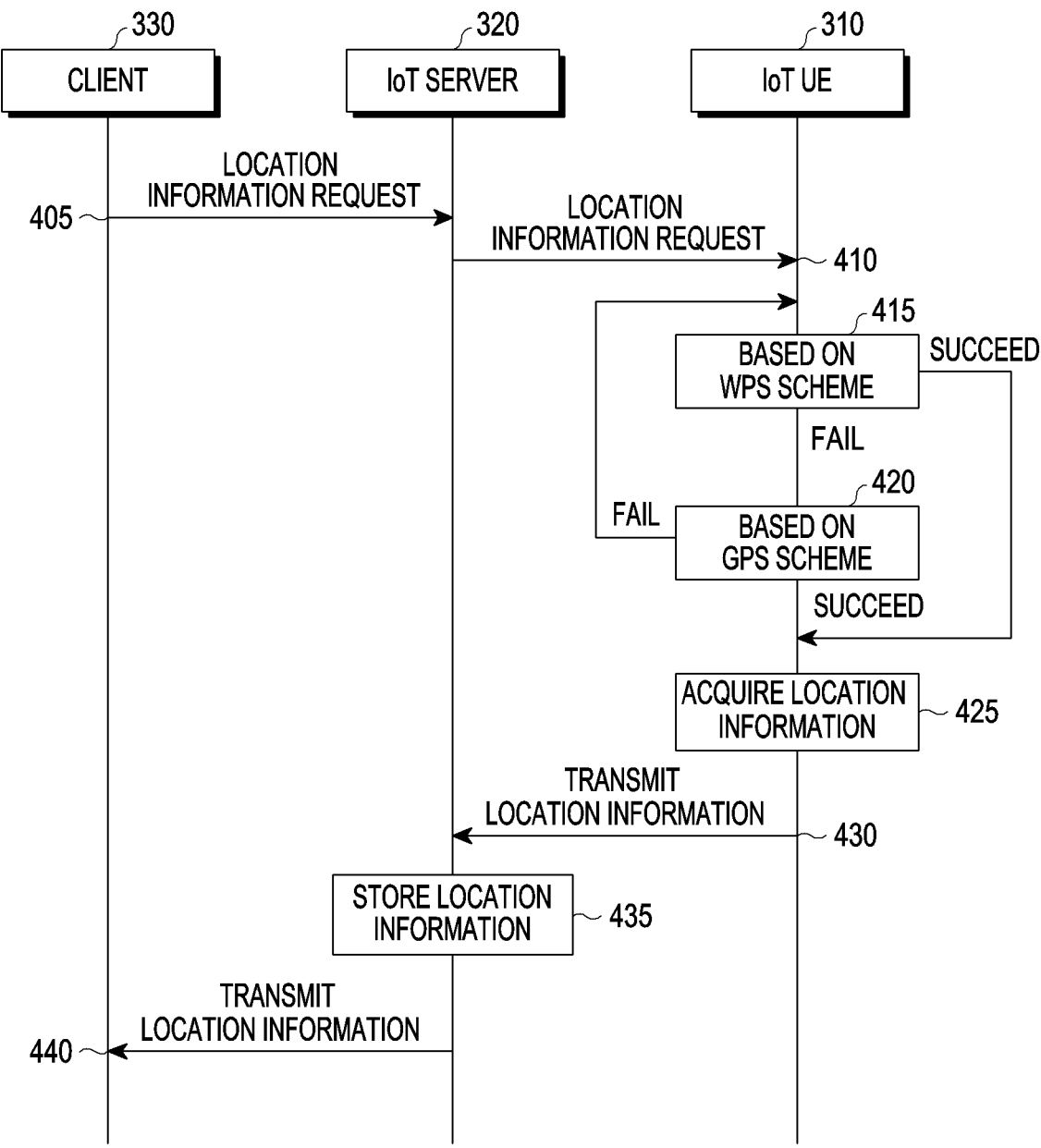
FIG. 4 illustrates an operation for transmitting location information of an electronic device according to various embodiments.

FIG. 4 illustrates an operation for transmitting location information of an electronic device according to various embodiments.

Referring to FIG. 4, according to various embodiments of the disclosure, the client 330 may transmit a request for receiving location information of the IoT UE 310 to the IoT server 320 through a communication module (for example, the communication module 190 of FIG. 1) in operation 405. According to various embodiments of the disclosure, upon receiving the request for transmission of the location information from the client 330 through the communication module (for example, the communication module 190 of FIG. 1) in operation 410, the IoT server 320 may transmit the received request to the IoT UE 310. According to various embodiments of the disclosure, upon receiving the request, the IoT UE 310 may perform an operation for acquiring location information of the IoT UE 310 (including time information) on the basis of a WPS scheme (in other words, through the WPS scheme) via a communication module (for example, the communication module 220 of FIG. 2A) in operation 415. According to various embodiments of the disclosure, when the IoT UE 310 fails in acquiring location information using the WPS scheme (for example, when the IoT UE 310 is located outdoors), the IoT UE 310 may perform an operation for acquiring location information of the IoT UE 310 through a Global Positioning System (GPS) scheme (or a GNSS scheme) via the communication module (for example, the communication module 220 of FIG. 2A) in operation 420. According to various embodiments of the disclosure, the sequences of operations 415 and 420 may be changed, or one thereof may be omitted.

According to various embodiments of the disclosure, when the IoT UE 330 fails in acquiring location in operation 420, the IoT UE 310 may perform the operation for acquiring the location information through the WPS scheme again. Alternatively, according to various embodiments of the disclosure, when the IoT UE 310 fails in acquiring the location information in operation 420, the IoT UE 310 may end the operation for acquiring the location information and perform operations after operation 415 (including operation 415) again after a predetermined time. According to various embodiments of the disclosure, when the IoT UE 310 acquires the location information, the IoT UE 130 may transmit the acquired location information to the IoT server 320 through the communication module (for example, the communication module 220 of FIG. 2A) in operations 425 and 430. Upon acquiring the location information from the IoT UE 310, the IoT server 320 may store the acquired location information in operation 435. According to various embodiments of the disclosure, the IoT server 320 may transmit the acquired location information to the client 330 through the communication module (for example, the communication module 190 of FIG. 2B) in operation 440. According to various embodiments of the disclosure, the IoT server 320 may transmit information on a time at which the location information is acquired to the client 330 along with the location information through the communication module (for example, the communication module 190 of FIG. 2B) in operation 440.

Figure 5A:
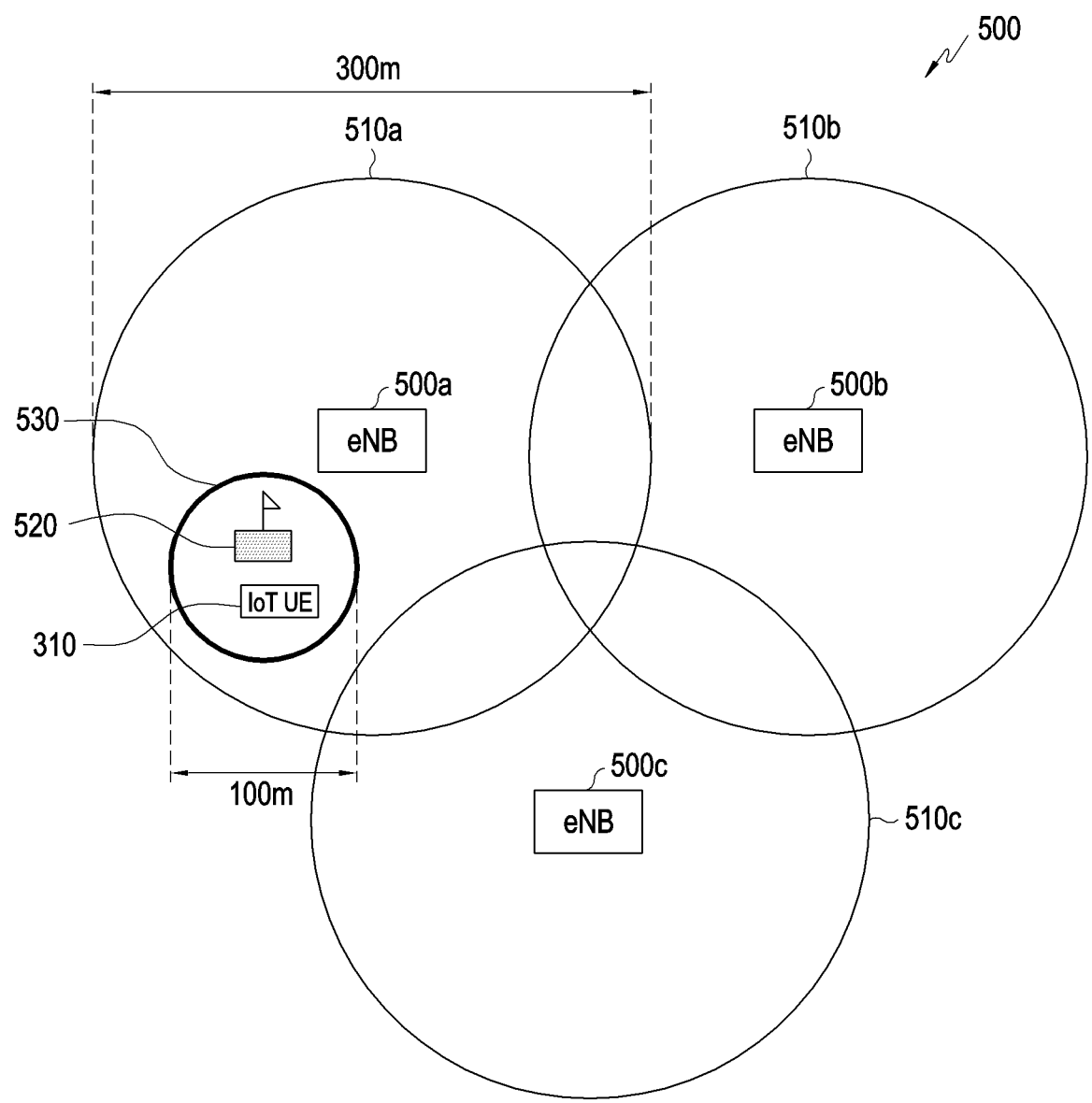
FIG. 5A illustrates a geographical area configured to an electronic device according to various embodiments.

FIG. 5A illustrates geographical areas configured to an electronic device according to various embodiments.

Referring to FIG. 5A, a network 500 according to various embodiments of the disclosure may include at least one eNB (for example, eNB 500a, 500b, and 500c). According to various embodiments of the disclosure, the network 500 may include an NB-IoT network. Cell coverages 510a, 510b, and 510c of at least one eNB may be, for example, 300 m. According to various embodiments of the disclosure, a geo-fence area 530 having a predetermined radius (for example, 100 m) from a specific point (for example, school 520) may be configured to the IoT UE 310.

Figure 5B:
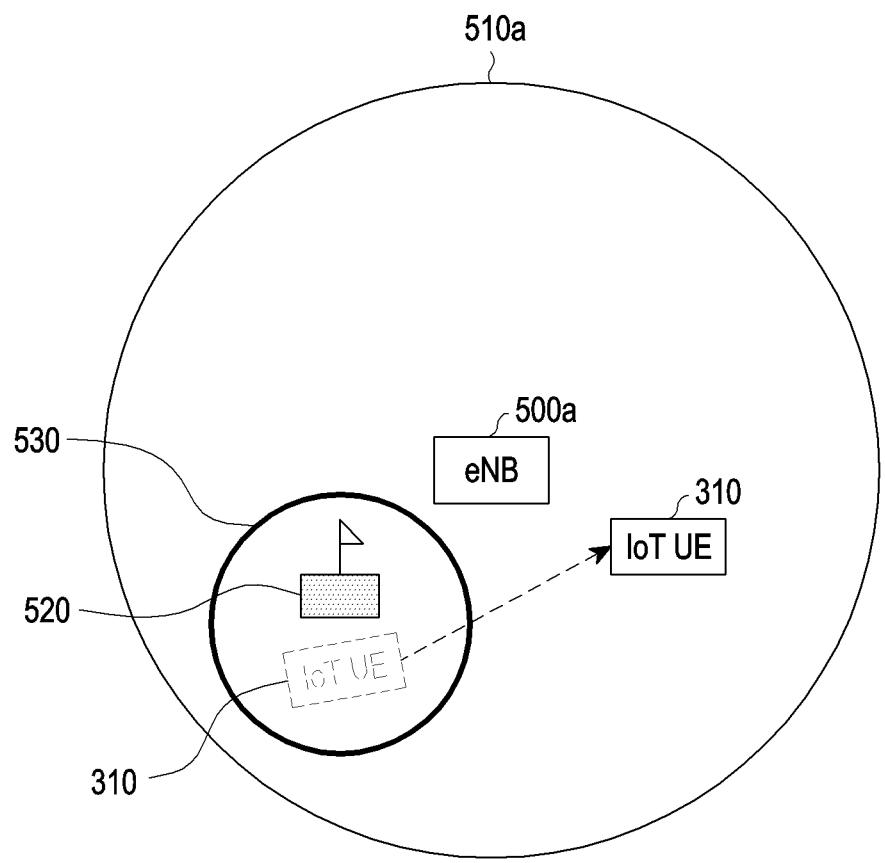
FIGS. 5B and 5C illustrate the case in which an electronic device moves according to various embodiments.
Figure 5C:
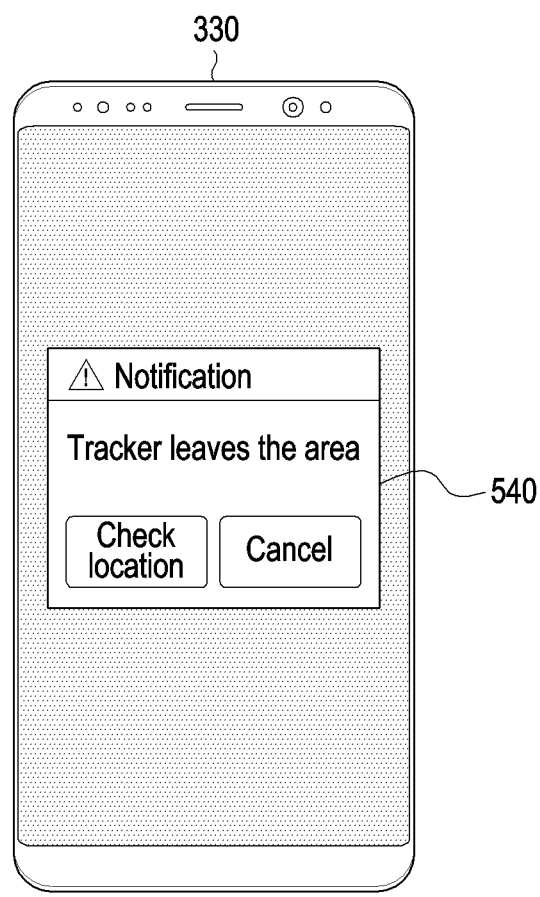

FIGS. 5B and 5C illustrate the case in which an electronic device moves according to various embodiments.

Referring to FIGS. 5B and 5C, the IoT UE 310 according to various embodiments of the disclosure may move outside the configured geo-fence area 530. In this case, a client (for example, the client 330) connected to the IoT UE 310 may display a notification message 540 informing that the IoT UE 310 leaves the configured geo-fence area 530.

The IoT UE 330 according to various embodiments of the disclosure may perform various operations according to three operation modes based on whether the IoT UE 310 moves. According to various embodiments of the disclosure, the modes may include a response mode configured to perform an operation for, when the current location information of the IoT UE 310 is acquired according to the request for the location information of the IoT UE 310 and the IoT UE 330 moves, transmitting the acquired current location information on an external electronic device (for example, the IoT server 320 and/or the client 330) having transmitted the request for the location information. According to various embodiments of the disclosure, the modes may include a response skip mode for, when the current location information of the IoT UE 310 is acquired according to the request for the location information of the IoT UE 310 and it is determined that the IoT UE 310 does not move on the basis of the acquired location information, ignoring (in other words, skipping a response to a paging signal) a signal (a paging signal in the disclosure) received in response to the request for the location information. According to various embodiments of the disclosure, the modes may include a monitoring skip mode for, when the current location information of the IoT UE 310 is acquired according to the request for the location information of the IoT UE 310 and the IoT UE 310 does not move, ignoring the paging signal and, thereafter, not monitoring the paging signal. According to various embodiments of the disclosure, a difference between the response skip mode and the monitoring skip mode is that, after the received paging signal is ignored, whether the operation for monitoring the paging signal is included or is not included. According to various embodiments of the disclosure, for example, when the IoT UE 310 enters an idle state, the paging signal may be monitored according to a Discontinuous Reception (DRX) cycle (in other words, period) or an extended DRX (eDRX) cycle. The DRX cycle may be configured as, for example, 10.24 seconds, but is only an example. The DRX cycle may be configured as various values from several seconds to dozens of hours. Information on the DRX cycle or the eDRX cycle according to various embodiments of the disclosure may be transmitted (in other words, allocated) to the IoT UE by a core network, or may be stored in the IoT UE 310. The core network may include, for example, the eNBs 500a, 500b, and 500c, and/or a Mobility Management Entity (MME).

In order to determine whether the IoT UE 310 moves, the IoT UE 310 may acquire information on a movement speed and a movement distance of the IoT UE 310. According to various embodiments of the disclosure, upon receiving the paging signal, the IoT UE 310 may detect a movement speed of the IoT UE 310 at a time point at which the paging signal is received through a sensor module (for example, the sensor module 230 of FIG. 2A) (for example, an acceleration sensor). According to various embodiments of the disclosure, the IoT UE 310 may acquire information related to the current location of the IoT UE 310 (for example, at least some pieces of information on current location coordinates of the IoT UE 310, information on surrounding buildings, or information on a time at which location information is provided to the IoT UE 310) through the communication module (for example, the communication module 220 of FIG. 2A) and then compare the acquired location information with location information acquired in the past (for example, most recently acquired (in other words, last) location information among the past location information stored in the IoT UE 310), so as to determine (in other words, calculate) the movement distance of the IoT UE 310. The IoT UE 310 may determine whether the detected movement speed and/or the determined movement distance is larger than a predetermined threshold speed and/or threshold distance. For example, the predetermined threshold speed may be 5 km/h, and the predetermined threshold distance may be 50 m. When at least one parameter (that is, the movement speed or the movement distance) among the movement speed and the movement distance is larger than the predetermined threshold value, the IoT UE 310 may determine that the IoT UE 310 is moving (or has already moved).

[Table 1] below shows an embodiment designated to operate according to the response skip mode when it is determined that the IoT UE 310 does not move according to various embodiments of the disclosure. According to various embodiments of the disclosure, when it is determined that the IoT UE 310 is moving (or has already moved) in response to determination of the IoT UE 310, an operation according to the response mode may be performed. According to various embodiments of the disclosure, when it is determined that the IoT UE 310 does not move (for example, when both the movement speed and the movement distance are equal to or smaller than their threshold values) in response to determination of the IoT UE 310, an operation according to the response skip mode may be performed.

TABLE 1

| Item | Movement speed | Movement distance | Execution mode |
| --- | --- | --- | --- |
| 1 | Larger than threshold value | Larger than threshold value | Response mode |
| 2 | Equal to or smaller than threshold value | Larger than threshold value | Response mode |
| 3 | Larger than threshold value | Equal to or smaller than threshold value | Response mode |
| 4 | Equal to or smaller than threshold value | Equal to or smaller than threshold value | Response skip mode |

[Table 2] below shows an embodiment designated for the operation according to the monitoring skip mode when it is determined that the IoT UE 310 does not move according to various embodiments of the disclosure. According to various embodiments of the disclosure, when it is determined that the IoT UE 310 is moving (or has already moved) in response to determination of the IoT UE 310, an operation according to the response mode may be performed. According to various embodiments of the disclosure, when it is determined that the IoT UE 310 does not move (for example, when both the movement speed and the movement distance are equal to or smaller than their threshold values) in response to determination of the IoT UE 310, an operation according to the monitoring skip mode may be performed.

TABLE 2

| Item | Movement speed | Movement distance | Execution mode |
| --- | --- | --- | --- |
| 1 | Larger than threshold value | Larger than threshold value | Response mode |
| 2 | Equal to or smaller than threshold value | Larger than threshold value | Response mode |
| 3 | Larger than threshold value | Equal to or smaller than threshold value | Response mode |
| 4 | Equal to or smaller than threshold value | Equal to or smaller than threshold value | Monitoring skip mode |

The embodiments shown in [Table 1] and [Table 2] above are only examples, but the IoT UE 310 may determine whether the IoT UE 310 moves on the basis of one parameter of the movement speed or the movement distance and perform an operation according to a mode corresponding to the determination result according to various embodiments of the disclosure. For example, when the movement speed of the IoT UE 310 at a time point at which the paging signal is received is larger than the threshold speed, the IoT UE 310 may determine that the IoT UE 310 has already moved or is at least moving and perform an operation according to the response mode. In this case, upon receiving the paging signal, the IoT UE 310 may acquire location information of the IoT UE 310. When the movement speed of the IoT UE 310 at the time point at which the paging signal is received is equal to or smaller than the threshold speed, the IoT UE 310 may determine that the IoT UE 310 does not move and perform an operation according to a predetermined mode among the response skip mode and the monitoring skip mode. In this case, upon receiving the paging signal, the IoT UE 310 may acquire location information of the IoT UE 310.

Figure 6A:
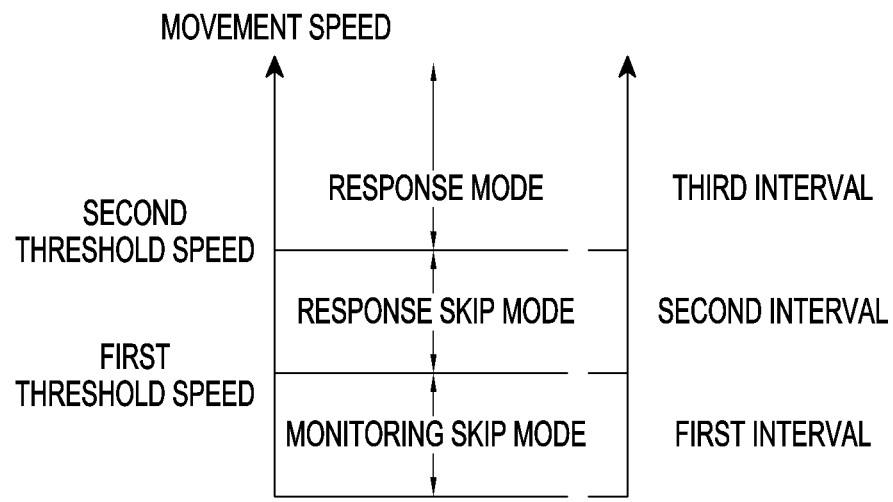
FIGS. 6A and 6B illustrate the operation for determining an operation mode of the electronic device according to various embodiments.
Figure 6B:
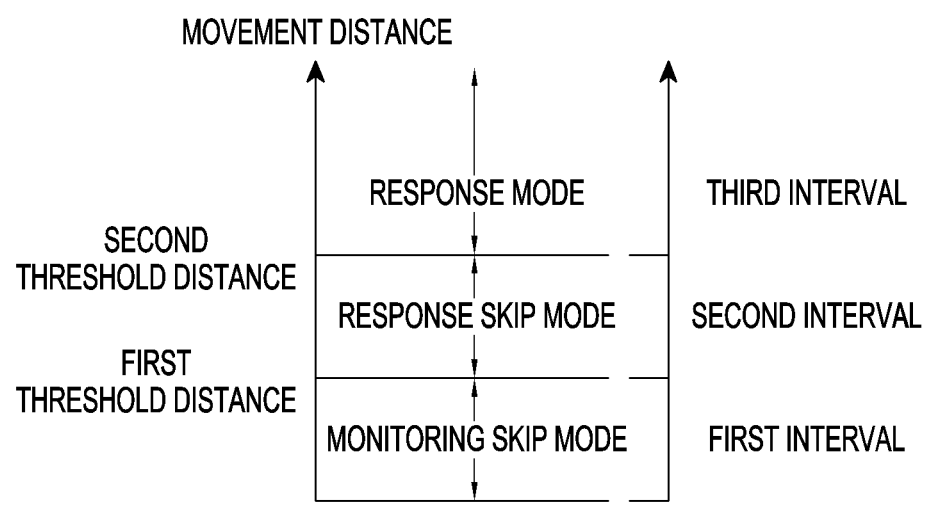

FIGS. 6A and 6B illustrate an operation for determining an operation mode according to various embodiments of the disclosure.

FIGS. 6A and 6B show embodiments in which the IoT UE 310 determines a mode according to the size (in other words, degree) of the movement speed and/or the movement distance unlike the embodiments described with reference to [Table 1] and [Table 2] above.

Referring to FIG. 6A, when the detected movement speed is equal to or smaller than a first threshold speed (for example, 3 km/h) (first interval), the IoT UE 310 may be configured to perform the operation according to the monitoring skip mode. When the detected movement speed is larger than the first threshold speed and equal to or smaller than a second threshold speed (for example, 5 km/h) (second interval), the IoT UE 310 may be configured to perform the operation according to the response skip mode. When the detected movement speed is larger than the second threshold speed (third interval), the IoT UE 310 may be configured to perform the operation according to the response mode. According to various embodiments of the disclosure, the second threshold speed may be a threshold speed by which it is not determined that the IoT UE 310 is moving or has already moved.

Referring to FIG. 6B, when the determined movement distance is equal to or smaller than a first threshold distance (for example, 25 m) (first interval), the IoT UE 310 may be configured to perform the operation according to the monitoring skip mode. When the determined movement distance is larger than the first threshold distance and equal to or smaller than a second threshold distance (for example, 50 m) (second interval), the IoT UE 310 may be configured to perform the operation according to the response skip mode. When the determined movement distance is larger than the second threshold distance (third interval), the IoT UE 310 may be configured to perform the operation according to the response mode. According to various embodiments of the disclosure, the second threshold distance may be a threshold distance by which it is not determined that the IoT UE 310 moves.

The embodiments illustrated in FIGS. 6A and 6B are only examples, but the IoT UE 310 may determine the operation mode on the basis of both the movement speed and the movement distance according to various embodiments of the disclosure. For example, when the movement distance corresponds to the first interval and the movement speed corresponds to the second interval, the IoT UE 310 may perform the operation according to the response skip mode. For example, when the movement distance corresponds to the second interval and the movement speed corresponds to the third interval, the IoT UE 310 may perform the operation according to the response mode. For example, when both the movement distance and movement speed correspond to the first intervals, the IoT UE 310 may perform the operation according to the monitoring skip mode. According to various embodiments of the disclosure, the operation for detecting the movement speed and the operation for determining the movement distance, described with reference to [Table 1], [Table 2], and FIGS. 6A and 6B above may be performed according to a predetermined period (for example, 30 minutes).

Various embodiments for determining whether the IoT UE 310 moves according to the movement distance of the IoT UE 310, described below according to various embodiments of the disclosure, are made on the basis of the assumption that the movement speed of the IoT UE 310 is equal to or smaller than the threshold speed. However, the following embodiments are only examples for describing various operations according to various embodiments of the disclosure, but other embodiments may be performed instead of the embodiments for the movement speed or embodiments for the movement speed may be additionally applied and performed.

Figure 7A:
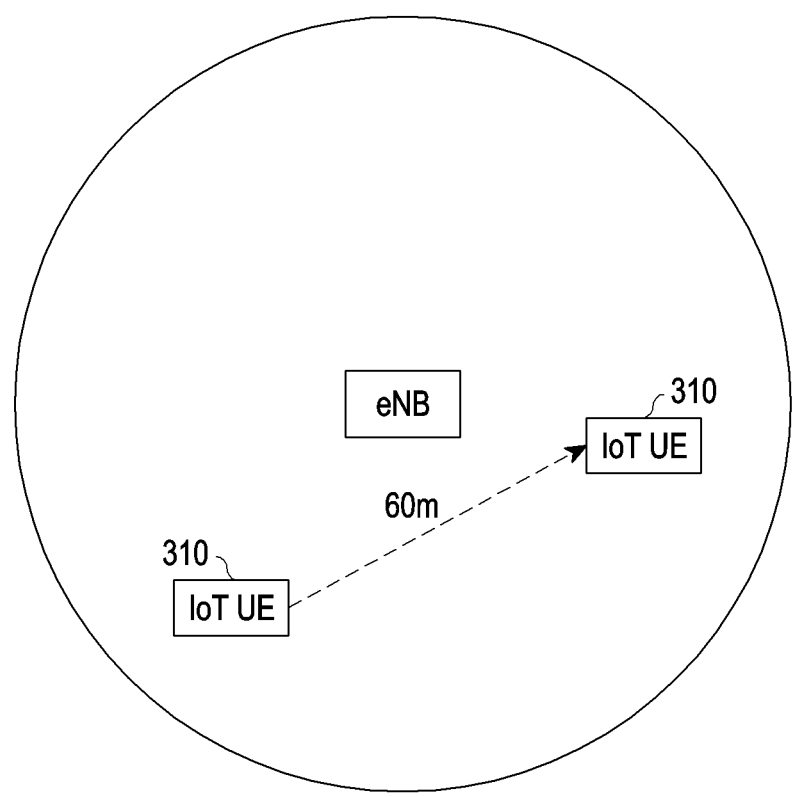
FIGS. 7A and 7B illustrate an operation performed by an electronic device on the basis of a response mode according to various embodiments.
Figure 7B:
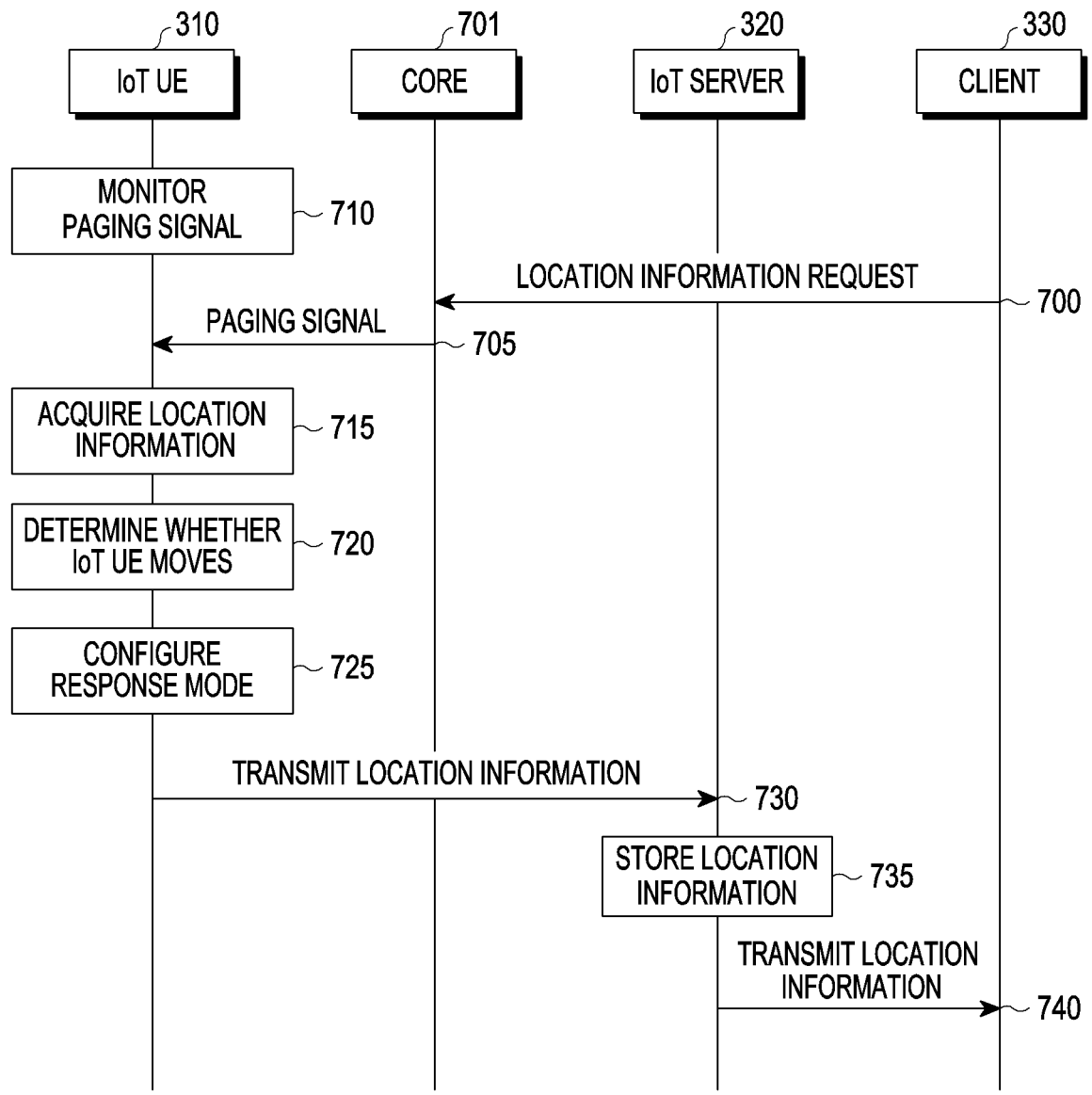

FIGS. 7A and 7B illustrate an operation performed on the basis of a response mode of an electronic device according to various embodiments.

FIG. 7A illustrates the case in which the IoT UE 310 moves by more than the threshold distance (for example, 50 m) (for example, moves 60 m). In this case, the IoT UE 310 may determine that the IoT UE 310 moves.

Referring to FIG. 7B, the client 330 may transmit a request for transmitting location information of the IoT UE 330 (briefly referred to as a location information request) to the IoT server 320 through a communication module (for example, the communication 190 of FIG. 1) in operation 700. According to various embodiments of the disclosure, the location information request may be made by, for example, reception of user input for identifying the location of the IoT UE 310. According to various embodiments of the disclosure, the IoT server 320 may transmit the received request to the core network 701 through a communication module (for example, the communication module 235 of FIG. 2B) in operation 700. In operation 700, the operation in which the location information request is transmitted from the client 330 to the IoT server 320 and the location information request received by the IoT server 320 is transmitted to the core network 701 is briefly marked by one arrow. According to various embodiments of the disclosure, the location information request may be transmitted to the IoT server 320, temporarily or permanently stored in the IoT server 320, and then transmitted to the core network 701 from the IoT server 320 after a predetermined time passes. According to various embodiments of the disclosure, after being transmitted to the IoT server 320, the location information request may be transmitted to the core network 701 without being stored in the IoT server 320. According to various embodiments of the disclosure, the location information request may be directly transmitted to the core network 701 without being transmitted to the IoT server 320 (or without passing through the IoT server 320). According to various embodiments of the disclosure, the core network 701 may include, for example, eNB (Node B) and/or Mobility Management Entity (MME).

According to various embodiments of the disclosure, the core network 701 may transmit a signal (for example, a paging signal) according to the received location information request to the IoT UE 310 in operation 705. According to various embodiments of the disclosure, the IoT UE 310 (for example, the processor 210 of FIG. 2A) may monitor the paging signal according to the DRX cycle in operation 710.

According to various embodiments of the disclosure, the IoT UE 310 (for example, the processor 210 of FIG. 2A) may acquire location information and/or time information of the IoT UE 310 according to reception of the paging signal through a communication module (for example, the communication module 190 or 220) in operation 715. According to various embodiments of the disclosure, the IoT UE 310 may acquire location information and/or time information of the IoT UE 310 during at least some intervals before operation 715. The location information and/or the time information may be acquired through the communication module (for example, the communication module 220 of FIG. 2A).

According to various embodiments of the disclosure, the IoT UE 310 (for example, the processor 210 of FIG. 2A) may determine whether the IoT UE 310 moves on the basis of the acquired location information and/or time information in operation 720.

According to various embodiments of the disclosure, when the IoT UE 310 moves by more than the threshold distance (for example, in FIG. 7A) on the basis of the determination in operation 720, the IoT UE 310 (for example, the processor 210 of FIG. 2A) may configure the operation mode of the IoT UE 310 to be the response mode in operation 725.

According to various embodiments of the disclosure, the IoT UE 310 (for example, the processor 210 of FIG. 2A) may transmit the location information and/or the time information acquired in operation 715 to the IoT server 320 through the communication module (for example, the communication module 220 of FIG. 2A) via the core network 701 in operation 730. In operation 730, the operation in which the location information is transmitted to the IoT server 320 via the core network 701 is briefly marked by one arrow. After being transmitted to the core network 701 and temporarily or permanently stored in the core network 701, the location information in operation 730 may be transmitted from the core network 701 to the IoT server 320. According to various embodiments of the disclosure, the location information may be transmitted from the core network 701 to the IoT server 320 without being stored in the core network 701.

According to various embodiments of the disclosure, the IoT server 320 (for example, the processor 225 of FIG. 2B) may store (or update) the location information and/or time information acquired in operation 730 in a memory (for example, the memory 215 of FIG. 2B) in operation 735.

According to various embodiments of the disclosure, the IoT server 320 (for example, the processor 225 of FIG. 2B) may transmit the location information and/or time information stored in operation 735 to the client through a communication module (for example, the communication module 235 of FIG. 2B) in operation 740.

The term "mode", "configured as a specific mode", or "switch to a specific mode" used in the disclosure may be terms used for convenience of description of various functions/operations performed according to various embodiments of the disclosure. That is, according to various embodiments of the disclosure, the term "mode" may be the state itself in which a specific function/functions or an operation/operations are performed. Therefore, according to various embodiments of the disclosure, for example, the term "configure as a specific mode" means only a state in which the function/functions or the operation/operations can be performed, but does not necessarily mean an input (for example, a user input) for "configuring a specific mode" or "switching to a specific mode" nor a change in specific hardware and/or software.

According to various embodiments of the disclosure, upon receiving the request for providing the location information, the IoT server 320 (for example, the processor 225 of FIG. 2B) may transmit the location information and/or the time location stored in operation 735 to the client 330 through a communication module (for example, the communication module 235 of FIG. 2B) in operation 740.

Figure 8A:
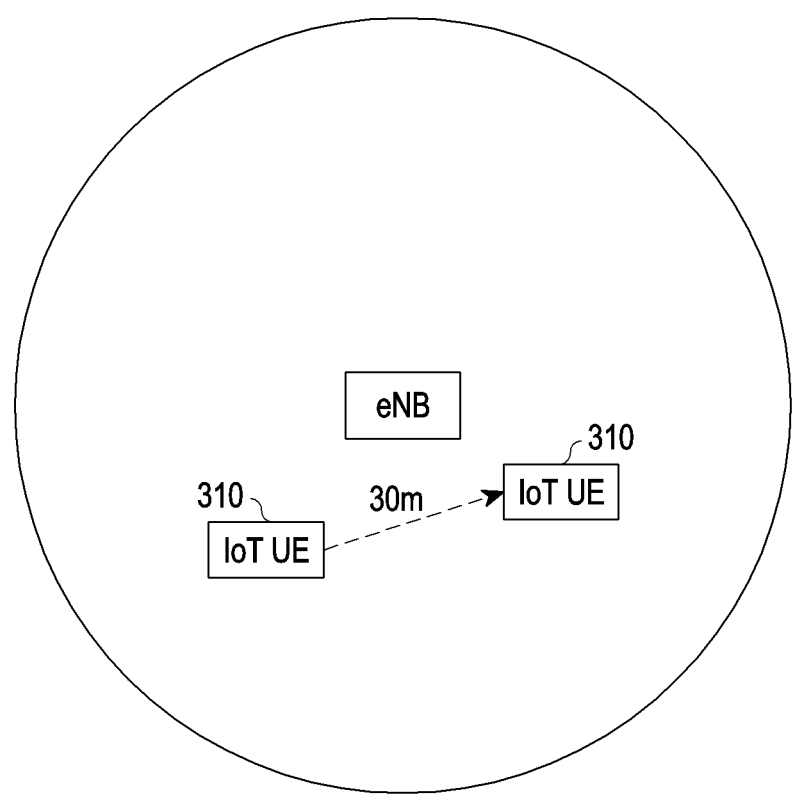
FIG. 8A illustrates the case in which an electronic device moves by the threshold distance or shorter according to various embodiments.

FIG. 8A illustrates the case in which an electronic device moves by the threshold distance or shorter according to various embodiments.

Figure 8B:
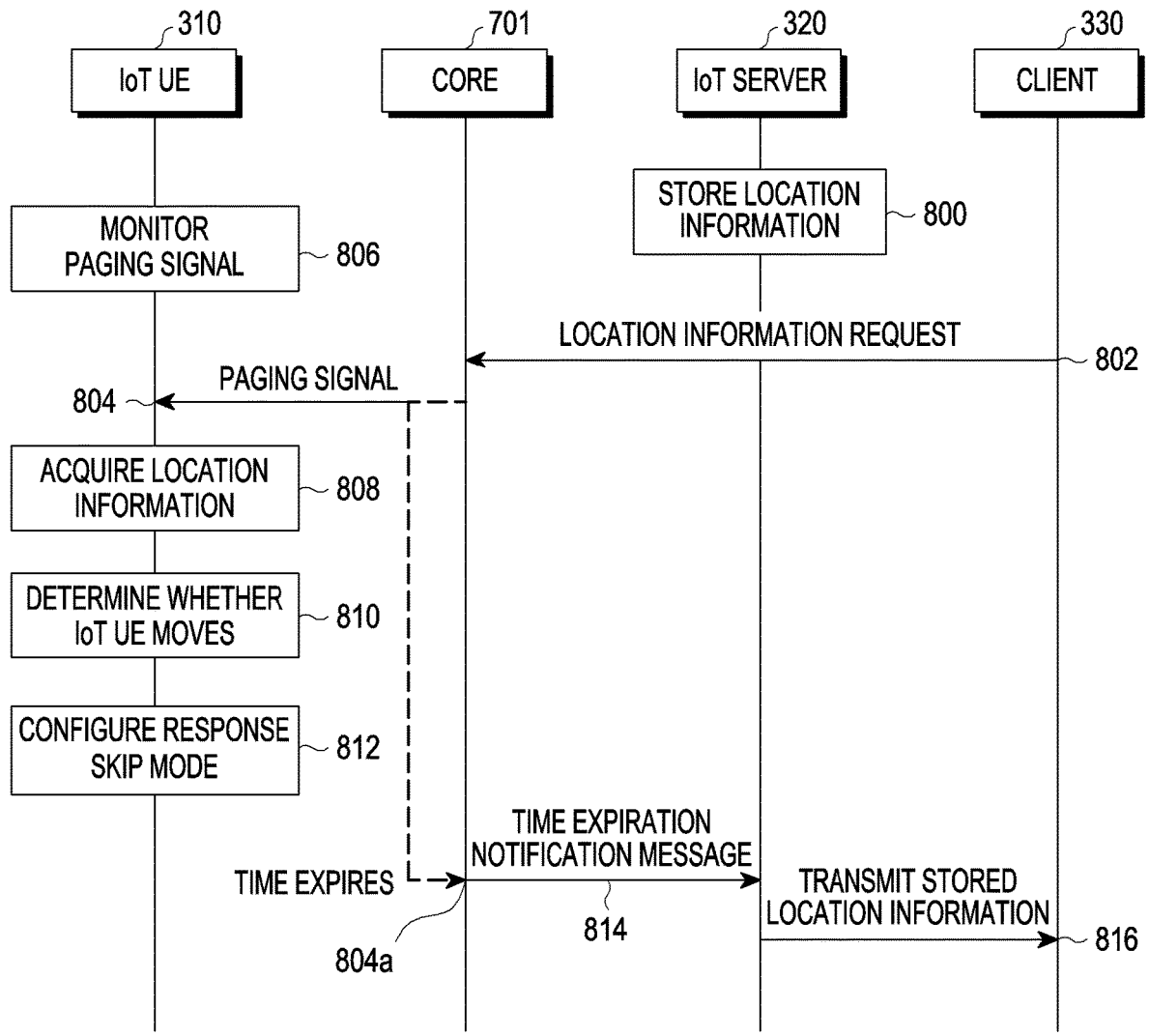
FIG. 8B illustrates an operation performed by the electronic device on the basis of a response skip mode according to various embodiments.
Figure 8C:
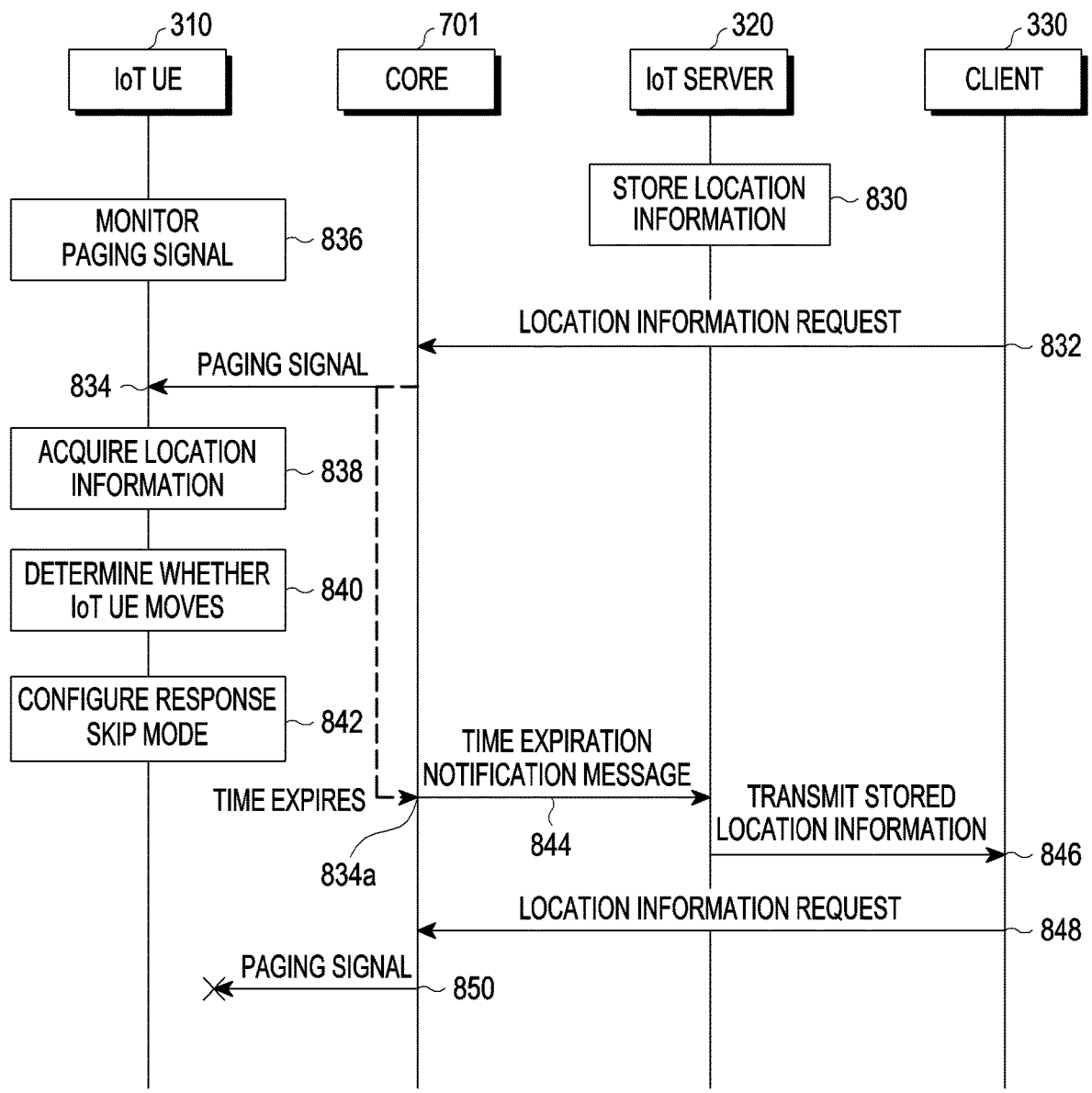
FIG. 8C illustrates an operation performed by the electronic device on the basis of a monitoring skip mode according to various embodiments.

FIG. 8A illustrates an example of the case in which the IoT UE 310 moves by the threshold distance (for example, 50 m) or shorter (for example, moves 30 m). In this case, the IoT UE 310 may determine that the IoT UE 310 has not moved. FIG. 8B illustrates the case in which the IoT UE 310 is configured to operate according to the response skip mode when the IoT UE 310 moves by the threshold distance or shorter (for example, in FIG. 8A). FIG. 8C illustrates the case in which the IoT UE 310 is configured to operate according to the monitoring skip mode when the IoT UE 310 moves by the threshold distance or shorter (for example, in FIG. 8A).

FIG. 8B illustrates an operation of an electronic device in the response skip mode according to various embodiments.

According to various embodiments of the disclosure, the IoT server 320 may store location information and/or time information transmitted from the IoT UE 310 since a specific time point in the past in a memory (for example, the memory 215 of FIG. 2B) in operation 800.

According to various embodiments of the disclosure, the client 330 may transmit a location information request of the IoT UE 310 to the IoT server 320 through a communication module (for example, the communication module 190 of FIG. 1) in operation 802. According to various embodiments of the disclosure, the IoT server 320 (for example, the processor 225 of FIG. 2B) may transmit the received request to the core network 701 through a communication module (for example, the communication module 235 of FIG. 2B) in operation 802. In operation 802, the operation in which the location information request is transmitted from the client 330 to the core network via the IoT server 320 is briefly marked by one arrow. According to various embodiments of the disclosure, the location information request in operation 802 may be transmitted to the IoT server 320, temporarily or permanently stored in the IoT server 320, and then transmitted to the core network 701 from the IoT server 320 after a predetermined time passes. According to various embodiments of the disclosure, the location information request may be transmitted to the IoT server 320 and then transmitted to the core network 701 without being stored in the IoT server 320. According to various embodiments of the disclosure, the location information request may be directly transmitted to the core network 701 without being transmitted to the IoT server 320 (or without passing through the IoT server 320).

According to various embodiments of the disclosure, the core network 701 may transmit a signal (for example, a paging signal) according to the received location information request to the IoT UE 310 in operation 804. According to various embodiments of the disclosure, the IoT UE 310 (for example, the processor 210 of FIG. 2A) may monitor the paging signal according to the DRX cycle in operation 806.

According to various embodiments of the disclosure, the IoT UE 310 (for example, the processor 210) may acquire location information and/or time information of the IoT UE 310 according to reception of the paging signal through a communication module (for example, the communication module 220 of FIG. 2A) in operation 808.

According to various embodiments of the disclosure, the IoT UE 310 (for example, the processor 210) may determine whether the IoT UE 310 moves on the basis of the acquired location information and/or time information in operation 810.

According to various embodiments of the disclosure, when the IoT UE 310 moves by a threshold distance or shorter on the basis of the determination in operation 810 (for example, in FIG. 8A), the IoT UE 310 (for example, the processor 210 of FIG. 2A) may configure the operation mode of the IoT UE 310 to be a response skip mode that is a designated operation mode in operation 812. The designated operation mode may be a predetermined operation mode during, for example, a manufacturing process of the IoT UE 310. According to various embodiments of the disclosure, the operation mode may be configured by the IoT UE 310 or a user of the client 330. According to various embodiments of the disclosure, although the IoT UE 310 receives the paging signal according to the response skip mode, the IoT UE 310 may not transmit a response to the paging signal to the core network 701 and/or the IoT server 320.

According to various embodiments of the disclosure, when a predetermined time has expired from the time point at which the paging signal of operation 804 is transmitted to the IoT UE 210 in operation 804a, the core network 701 may transmit a time expiration notification message to the IoT server 320 in operation 814.

According to various embodiments of the disclosure, the IoT server 320 (for example, the processor 225 of FIG. 2B) may transmit the location information and/or time information stored in operation 800 to the client on the basis of reception of the time expiration notification message in operation 816.

FIG. 8C illustrates an operation performed by the IoT UE 310 in the monitoring skip mode according to various embodiments.

According to various embodiments of the disclosure, the IoT server 320 may store location information and/or time information transmitted from the IoT UE 310 since a specific time point in the past in a memory (for example, the memory 215 of FIG. 2B) in operation 830.

According to various embodiments of the disclosure, the client 330 may transmit a location information request of the IoT UE 310 to the IoT server 320 through a communication module (for example, the communication module 190 of FIG. 1) in operation 832. According to various embodiments of the disclosure, the IoT server 320 (for example, the processor 210) may transmit the received request to the core network 701 through a communication module (for example, the communication module 235 of FIG. 2B) in operation 832. In FIG. 8C, the operation in which the location information request is transmitted from the client 330 to the core network 701 via the IoT server 320 is briefly marked by one arrow in operation 832. According to various embodiments of the disclosure, the location information request in operation 832 may be transmitted to the IoT server 320, temporarily or permanently stored in the IoT server 320, and then transmitted to the core network 701 from the IoT server 320 after a predetermined time passes. According to various embodiments of the disclosure, the location information request may be transmitted to the core network 701 without being stored in the IoT server 320. According to various embodiments of the disclosure, the location information request may be directly transmitted to the core network 701 without being transmitted to the IoT server 320 (or without passing through the IoT server 320).

According to various embodiments of the disclosure, the core network 701 may transmit a signal (for example, a paging signal) according to the received location information request to the IoT UE 310 in operation 834. According to various embodiments of the disclosure, the IoT UE 310 (for example, the processor 120 of FIG. 2A) may monitor the paging signal according to the DRX cycle in operation 836.

According to various embodiments of the disclosure, the IoT UE 310 (for example, the processor 210 of FIG. 2A) may acquire location information and/or time information of the IoT UE 310 according to reception of the paging signal through a communication module (for example, the communication module 220) in operation 838.

According to various embodiments of the disclosure, the IoT UE 310 (for example, the processor 210 of FIG. 2A) may determine whether the IoT UE 310 moves on the basis of the acquired location information and/or time information in operation 840.

According to various embodiments of the disclosure, when the IoT UE 310 moves by a threshold distance or shorter on the basis of the determination in operation 840 (for example, in FIG. 8A), the IoT UE 310 (for example, the processor 210 of FIG. 2A) may configure the operation mode of the IoT UE 310 to be the monitoring skip mode that is a designated operation mode in operation 842. The designated operation mode may be a predetermined operation mode during, for example, a manufacturing process of the IoT UE 310. According to various embodiments of the disclosure, the operation mode may be configured by the IoT UE 310 or a user of the client 330. According to various embodiments of the disclosure, the IoT UE 310 may not monitor the paging signal even during a time for monitoring the paging signal (for example, a paging time window (PTW) interval or an on-duration interval) by the monitoring skip mode.

According to various embodiments of the disclosure, when a predetermined time has expired from the time point at which the paging signal of operation 838 is transmitted in operation 834a, the core network 701 may transmit a time expiration notification message to the IoT server 320 in operation 844.

According to various embodiments of the disclosure, the IoT server 320 (for example, the processor 225 of FIG. 2B) may transmit the latest location information among the location information stored in operation 830 to the client 330 on the basis of reception of the time expiration notification message in operation 846. According to various embodiments of the disclosure, the time information stored in the IoT server 320 may be transmitted to the client 330 in operation 846.

According to various embodiments of the disclosure, even though a paging signal according to a request for location information from the client 330 is transmitted to the IoT UE 310 in operations 848 and 850 after the monitoring skip mode, the IoT UE 310 may not monitor the paging signal and thus cannot detect the paging signal.

According to various embodiments of the disclosure, the operation for determining the movement speed of the IoT UE 310 may be included instead of the operation in which the IoT UE 310 acquires the location information according to reception of the paging signal. In this case, operation 838 may be replaced with the operation of acquiring speed information. According to various embodiments of the disclosure, the IoT UE 310 may determine whether the IoT UE 310 moves on the basis of information on the acquired movement speed.

Figure 8D:
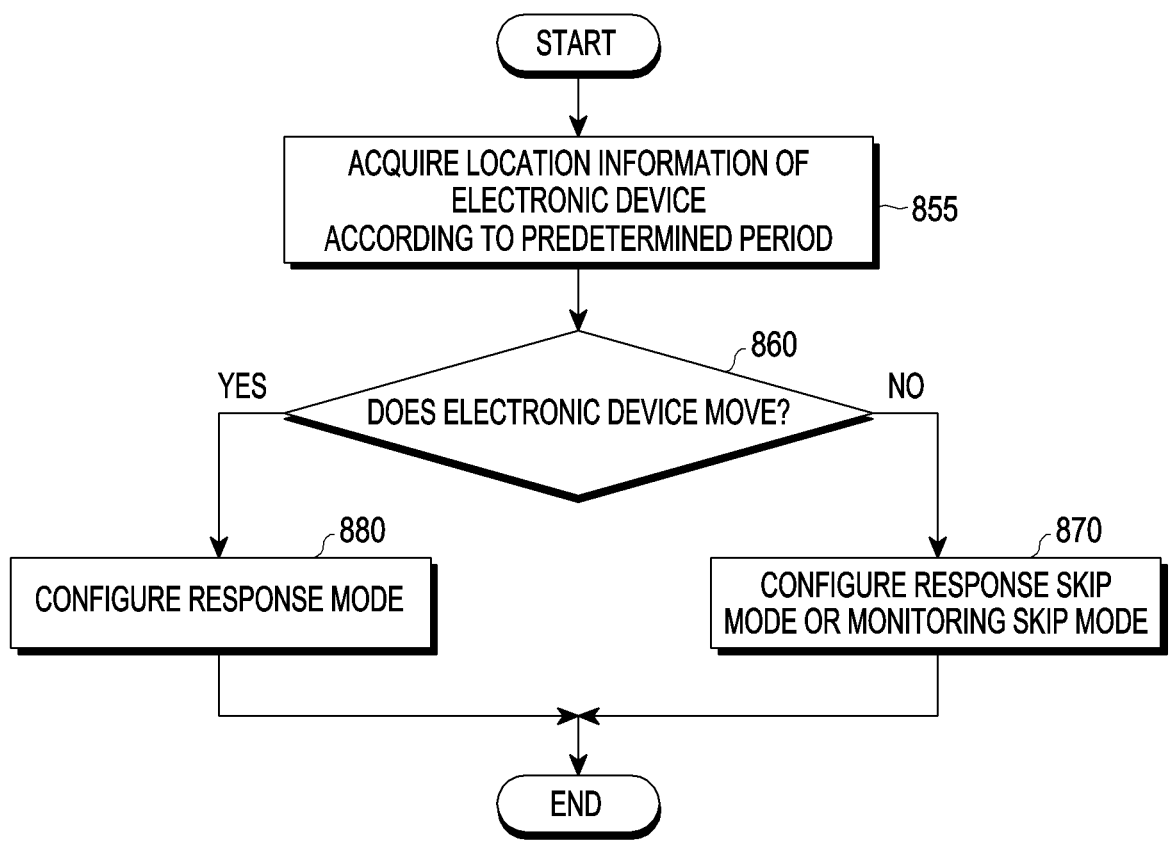
FIG. 8D illustrates a method of operating the electronic device according to various embodiments.

FIG. 8D illustrates a method of operating the electronic device according to various embodiments.

According to various embodiments, operations 855 to 880 illustrated in FIG. 8D may be executed through one (for example, the processor 210) of the elements included in the electronic device (for example, the IoT UE 310). FIG. 8D is a flowchart illustrating an embodiment in which the electronic device is configured to periodically acquire (or update) the current location information regardless of whether a paging signal is received according to various embodiments of the disclosure.

Referring to FIG. 8D, according to various embodiments of the disclosure, the electronic device may perform an operation for acquiring location information of the electronic device according to a predetermined period through a communication module (for example, the communication module 220 of FIG. 2A) in operation 855.

According to various embodiments of the disclosure, the electronic device may determine whether the electronic device moves on the basis of the acquired location information in operation 860.

According to various embodiments of the disclosure, when it is determined that the electronic device moves, the electronic device may configure the operation mode of the electronic device to be a response skip mode or a monitoring skip mode in operation 870.

According to various embodiments of the disclosure, when it is determined that the electronic device has not moved, the electronic device may configure the operation of the electronic device to be a response mode in operation 880.

Although FIG. 8D illustrates the embodiment in which the electronic device periodically acquires location information, an operation for acquiring speed information instead of or in addition to the location information and an operation for determining whether the electronic device moves on the basis of the acquired speed information may be included according to various embodiments of the disclosure.

Figure 9:
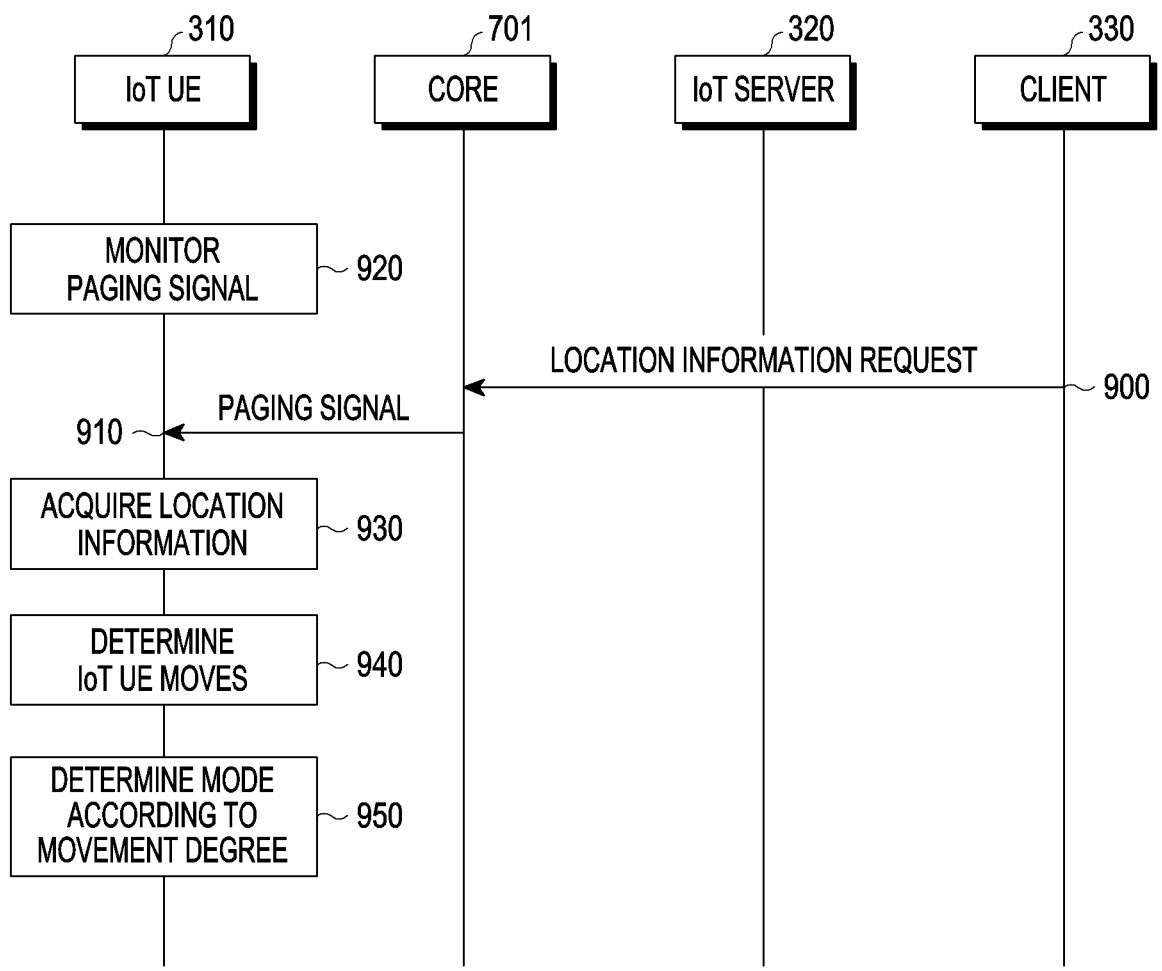
FIG. 9 illustrates an operation in which the electronic device determines an operation mode according to various embodiments.

FIG. 9 illustrates an operation in which the electronic device determines an operation mode according to various embodiments.

Referring to FIG. 9, the client 330 may transmit a location information request of the IoT UE 310 to the IoT server 320 through a communication module (for example, the communication module 190 of FIG. 1) in operation 900. According to various embodiments of the disclosure, the IoT server 320 (for example, the processor 225 of FIG. 2B) may transmit the received request to the core network 701 through a communication module (for example, the communication module 235 of FIG. 2G) in operation 900. In FIG. 9, the operation in which the request for providing location information is transmitted from the client 330 to the core network 701 via the IoT server 320 is briefly marked by one arrow in operation 900. According to various embodiments of the disclosure, the request for providing the location information in operation 900 may be transmitted to the IoT server 320, temporarily or permanently stored in the IoT server 320, and then transmitted to the core network 701 from the IoT server 320 after a predetermined time passes. According to various embodiments of the disclosure, the location information request may be transmitted to the IoT server 320 and then transmitted to the core network 701 without being stored in the IoT server 320. According to various embodiments of the disclosure, the location information request may be directly transmitted to the core network 701 without being transmitted to the IoT server 320 (or without passing through the IoT server 320).

According to various embodiments of the disclosure, the core network 701 may transmit a signal (for example, a paging signal) according to the received location information request to the IoT UE 310 in operation 910. According to various embodiments of the disclosure, the IoT UE 310 (for example, the processor 210 of FIG. 2A) may monitor the paging signal according to the DRX cycle in operation 920.

According to various embodiments of the disclosure, the IoT UE 310 (for example, the processor 210 of FIG. 2A) may acquire location information and/or time information of the IoT UE 310 according to reception of the paging signal through a communication module (for example, the communication module 220) in operation 930.

According to various embodiments of the disclosure, the IoT UE 310 (for example, the processor 210 of FIG. 2A) may determine whether the IoT UE 310 moves on the basis of the acquired location information and/or time information in operation 940.

According to various embodiments of the disclosure, the IoT UE 310 (for example, the processor 210 of FIG. 2A) may determine the mode according to a movement degree on the basis of the determination of operation 940 in operation 950. For example, when the determined movement distance is equal to or smaller than a first threshold distance (for example, 25 m) (the first interval of FIG. 6A), the IoT UE 310 may determine to perform the operation according to the monitoring skip mode. When the determined movement distance is larger than the first threshold distance and equal to or smaller than a second threshold distance (for example, 50 m) (second interval of FIG. 6A), the IoT UE 310 may determine to perform the operation according to the response skip mode. When the determined movement distance is larger than the second threshold distance (third interval of FIG. 6A), the IoT UE 310 may determine to perform the operation according to the response mode.

According to various embodiments of the disclosure, the IoT UE 310 may determine whether the IoT UE 310 moves on the basis of speed information instead of the location information. For example, when the detected movement speed is equal to or slower than a first threshold speed (for example, 3 km/h) (first interval of FIG. 6B), the IoT UE 310 may determine to perform the operation according to the monitoring skip mode. When the detected movement speed is faster than the first threshold speed and equal to or slower than a second threshold speed (for example, 5 km/h) (second interval of FIG. 6B), the IoT UE 310 may determine to perform the operation according to the response skip mode. When the detected movement speed is faster than the second threshold speed (third interval of FIG. 6B), the IoT UE 310 may determine to perform the operation according to the response mode.

Figure 10A:
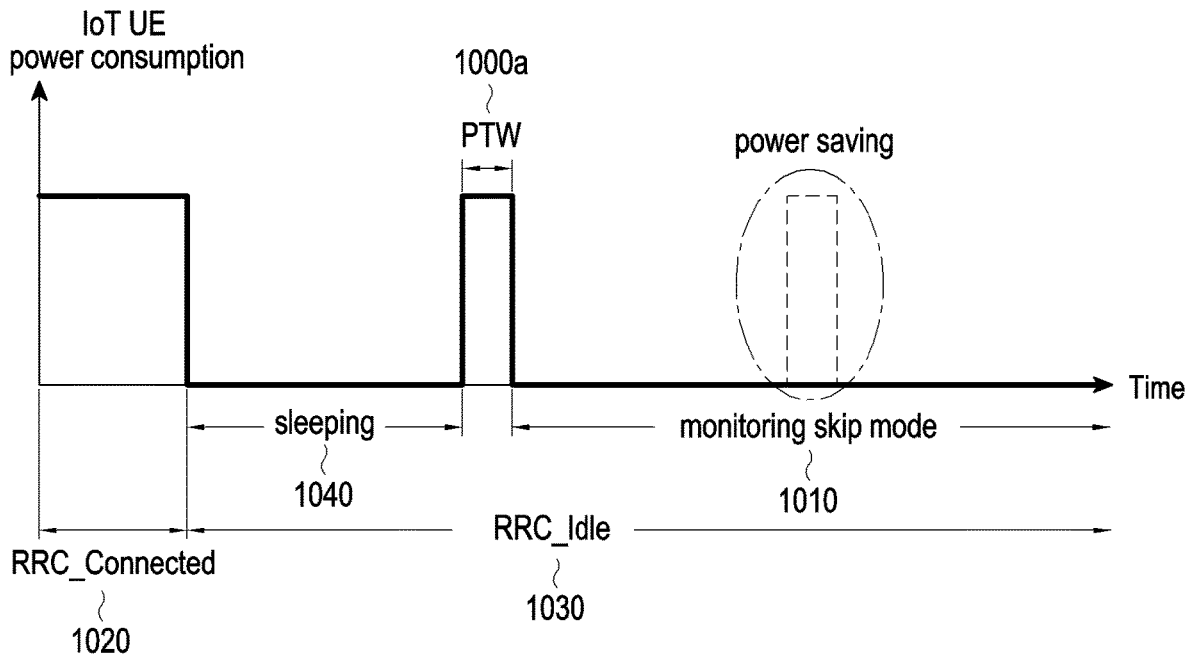
FIGS. 10A and 10B illustrate the operation for reducing power consumption of an electronic device according to various embodiments.
Figure 10B:
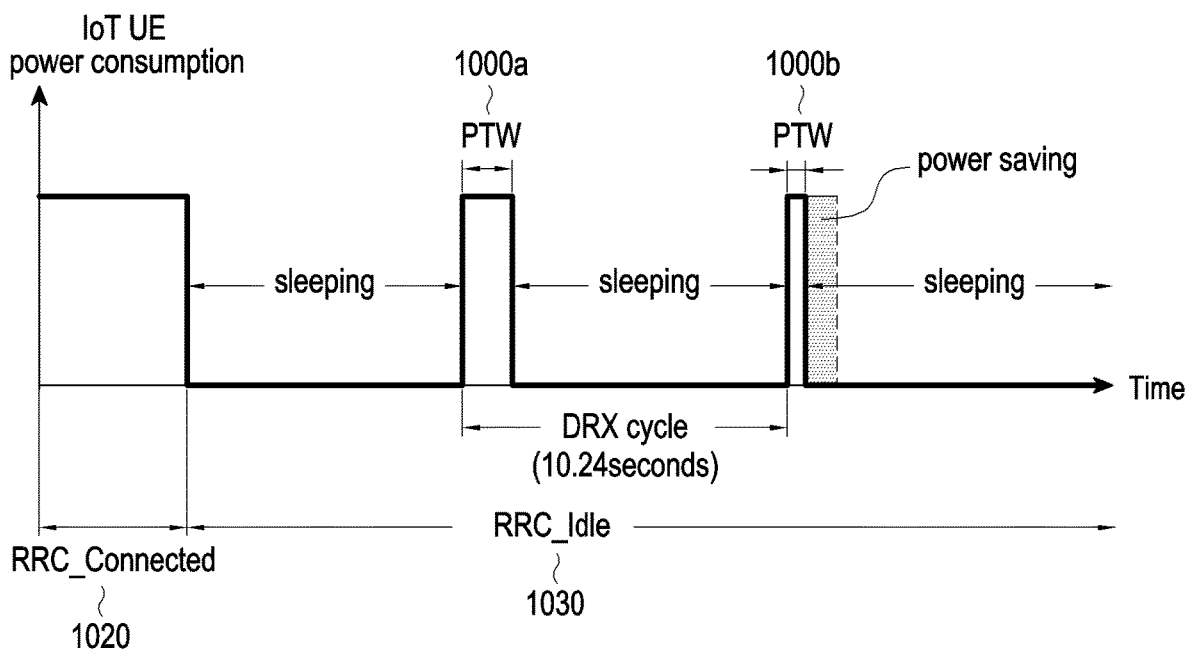

FIGS. 10A and 10B illustrate an operation for reducing power consumption of the electronic device according to various embodiments.

Referring to FIG. 10B, the IoT UE 310 according to various embodiments of the disclosure may monitor a paging signal in a paging time window 1000a only when a change in the location of the IoT UE 310 is detected. When there is no change in the location of the IoT UE 310 or a degree of the movement is small (that is, it is determined that the IoT UE 310 does not move), the IoT UE 310 may switch to a monitoring skip mode 1010 and does not monitor the paging signal, thereby reducing power consumption generated by monitoring of the paging signal and power consumption generated by transmission of a response to the paging signal. In FIG. 10A, a "Radio Resource Control (RRC) connected state 1020" may be a state in which RRC of the IoT UE 310 is in a logical connection state with RRC of an E-UTRAN, and an "RRC idle state 1030" may be a state in which RRC of the IoT UE 310 is not connected to RRC of the E-UTRAN. A sleeping state 1040 may be a time interval or a state in which the IoT UE 310 does not detect whether a paging signal is received, and the IoT UE 310 may detect whether the paging signal is received during the paging time window (PTW) 1000a in the "RRC idle state".

According to various embodiments of the disclosure, when there is no change in the location of the IoT UE 310 or a degree thereof is small (for example, in FIG. 10B), the IoT UE 310 may monitor the paging signal according to a reduced time compared to a predetermined time during at least some intervals (for example, the paging time window 1000b) of the paging time windows 1000a and 1000b, thereby reducing some of the power consumption generated by monitoring of the paging signal. Information on the paging time window having the reduced time compared to the predetermined time may be allocated by, for example, the core network or may be stored in the memory of the IoT UE 310. According to various embodiments of the disclosure, the IoT UE 310 may perform the monitoring according to the information allocated by the core network 701 or on the basis of the information stored in the memory 240.

Figure 11A:
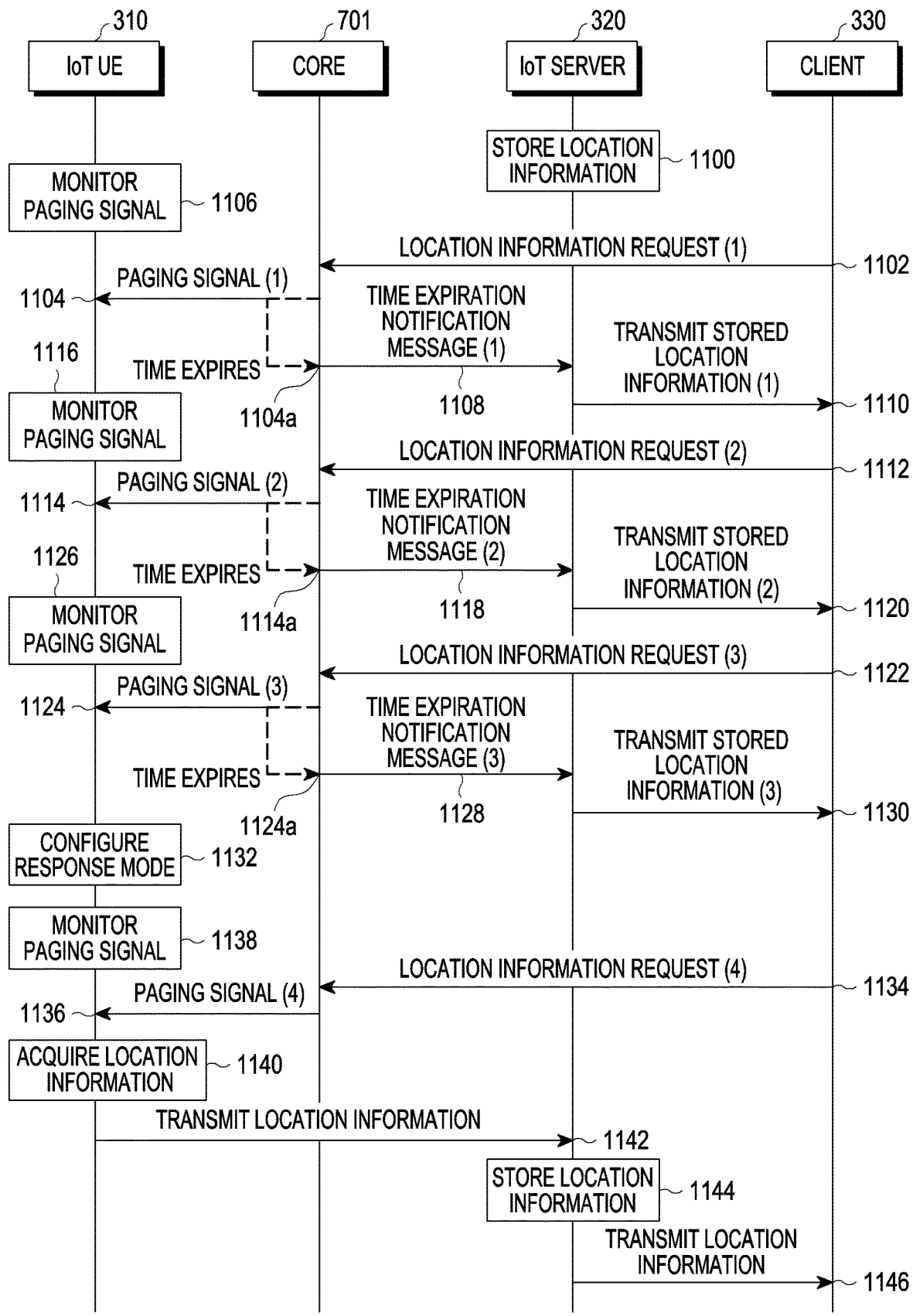
FIGS. 11A to 11C illustrate operations for switching the electronic device to a response mode according to various embodiments.
Figure 11B:
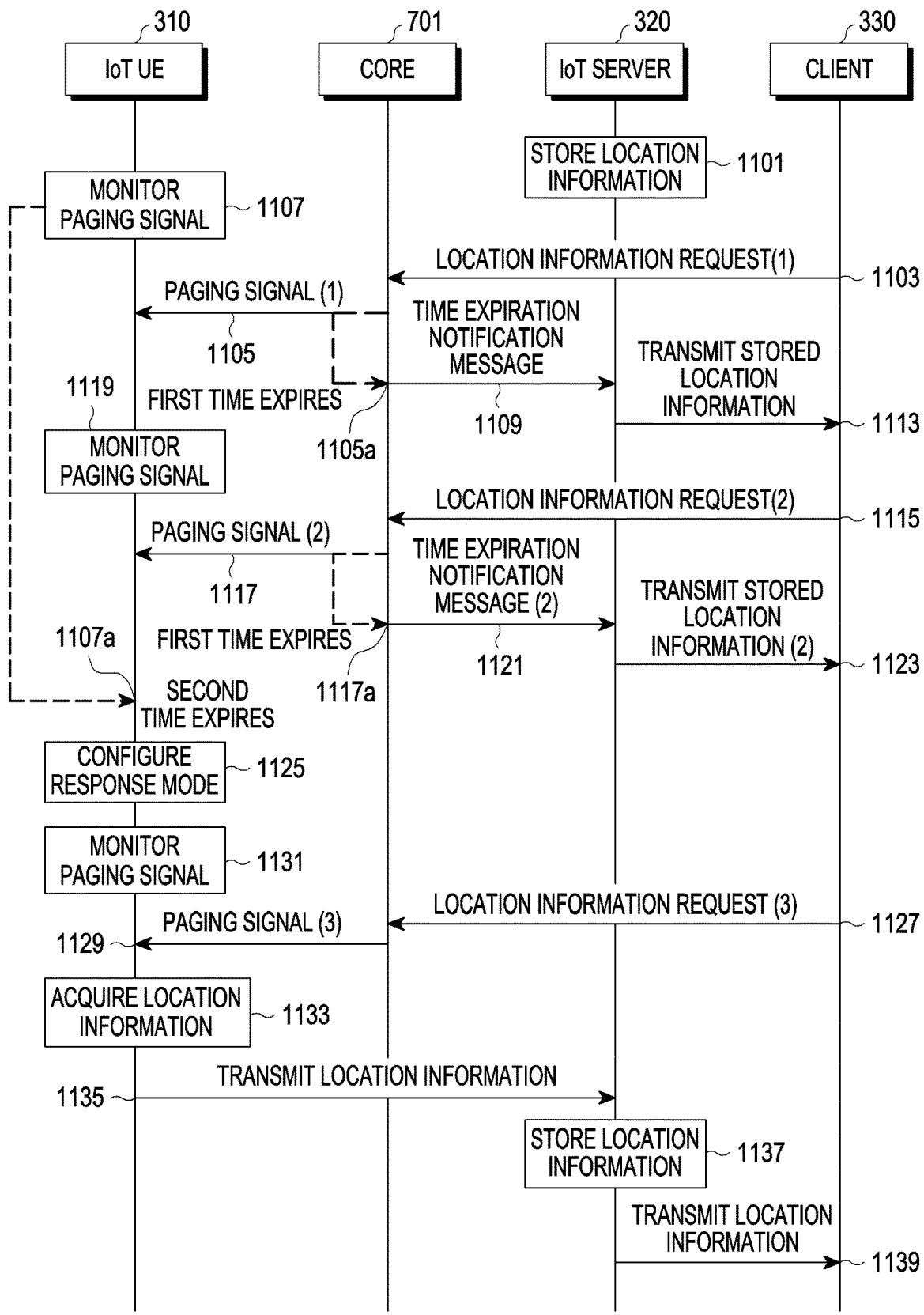
Figure 11C:
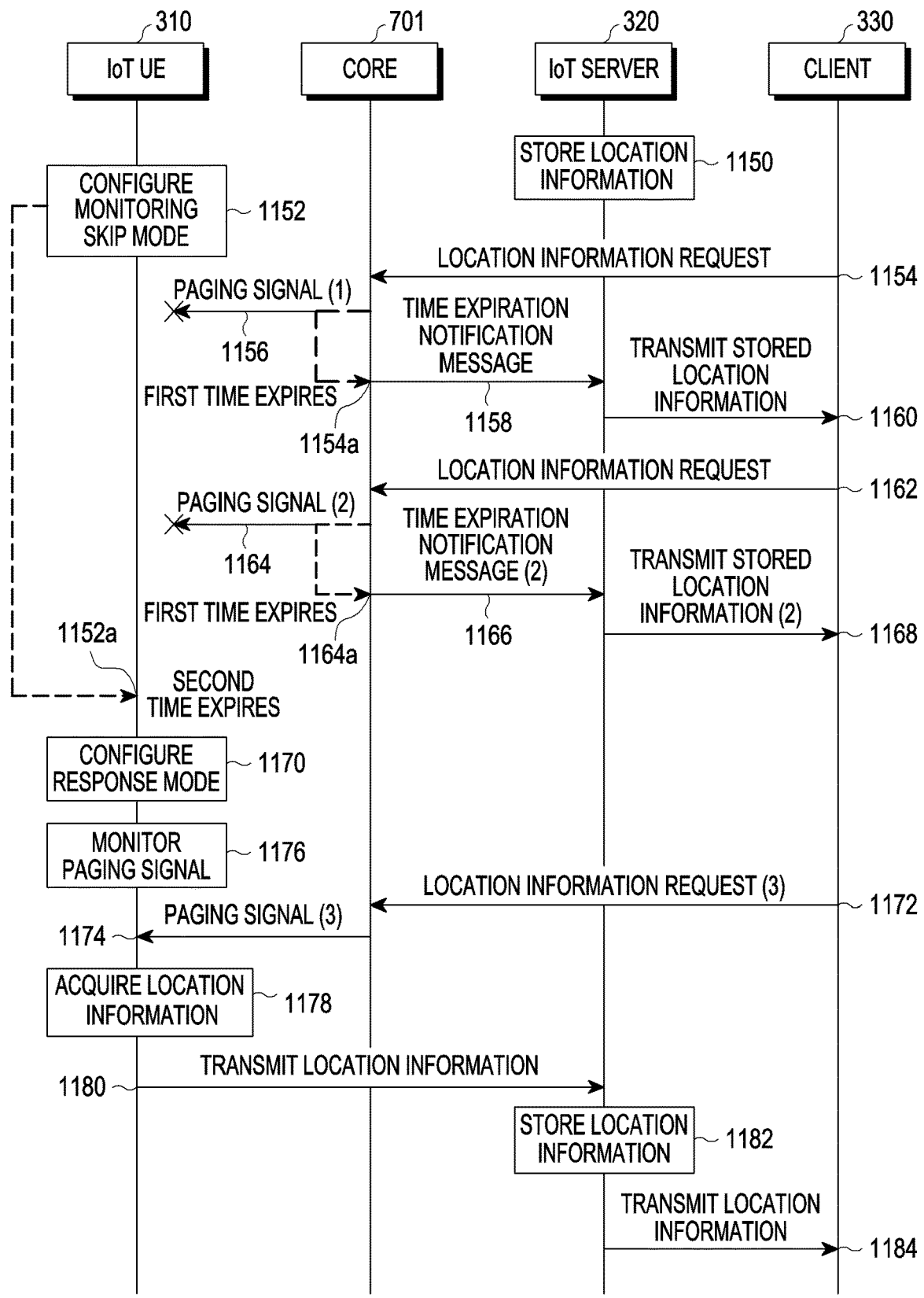

FIGS. 11A to 11C illustrate operations for switching the electronic device to a response mode according to various embodiments.

FIGS. 11A to 11C illustrate embodiments distinguished from embodiments in which no response is transmitted since power of the IoT UE 310 is turned off according to various embodiments of the disclosure and there is no movement of the IoT UE 310 according to various embodiments of the disclosure. FIGS. 11A and 11B illustrate embodiments in which the IoT UE 310 operates in the response skip mode, and FIG. 11C illustrates an embodiment in which the IoT UE 310 operates in the monitoring skip mode. In FIGS. 11A to 11C, at least some of the content described with reference to FIGS. 8B and 8C will be omitted for a detailed description of various embodiments of the disclosure.

Referring to FIG. 11A, the IoT server 320 may store location information and/or time information transmitted from the IoT UE 310 since a specific timer point in the past in a memory (for example, the memory 215 of FIG. 2B) in operation 1100.

According to various embodiments of the disclosure, the client 330 may transmit a location information request of the IoT UE 310 to the IoT server 320 through a communication module (for example, the communication module 190 of FIG. 1) in operation 1102.

According to various embodiments of the disclosure, the core network 701 may transmit a signal (for example, a paging signal) according to the received location information request to the IoT UE 310 in operation 1104. According to various embodiments of the disclosure, the IoT UE 310 (for example, the processor 210 of FIG. 2A) may monitor the paging signal according to the DRX cycle in operation 1106.

According to various embodiments of the disclosure, the IoT UE 310 may ignore the received paging signal of operation 1104 according to the response skip mode. When a predetermined time has expired from a time point at which the paging signal of operation 1104 is transmitted to the IoT UE 310 in operation 1104a, the core network may transmit a time expiration notification message to the IoT server 323 in operation 1108.

According to various embodiments of the disclosure, the IoT server 320 (for example, the processor 225 of FIG. 2B) may transmit the location information stored in operation 1100 to the client 330 on the basis of reception of the time expiration notification message in operation 1110. According to various embodiments of the disclosure, in operation 1110, the time information stored in the IoT server 320 may be transmitted to the client.

According to various embodiments of the disclosure, in the response skip mode, the client 330, the IoT server 320, the core network 701, and the IoT UE 310 may repeatedly perform operations 1102 to 1110 a predetermined number of times (for example, three times) (for example, in operations 1112 to 1130). According to various embodiments of the disclosure, in the response skip mode, the IoT UE 310 may monitor the paging signal the predetermined number of times, or when the paging signal is detected the predetermined number of times, switch the operation mode of the IoT UE 310 to the response mode and perform the operation according to the response mode even though it is determined that the IoT UE 310 does not move (for example, in operations 1138 to 1146). According to various embodiments of the disclosure, when the number of times the paging signal is monitored is different from the number of times the paging signal is detected, the IoT UE 310 may switch the operation mode to the response mode if at least one of the number of monitorings and the number of detections reaches the predetermined number. The description of operations 1138 to 1146 may be the same as the description made with reference to FIG. 7B. According to various embodiments of the disclosure, through the function/operation for switching to the response mode, the state can be distinguished from a power-off state of the IoT UE 310 by the user of the client, so that user convenience can be increased.

Referring to FIG. 11B, the IoT server 320 may store location information and/or time information transmitted from the IoT UE 310 since a specific time point in the past in a memory (for example, the memory 215 of FIG. 2B) in operation 1101.

According to various embodiments of the disclosure, the client 330 may transmit a location information request of the IoT UE 310 to the IoT server 320 through a communication module (for example, the communication module 190 of FIG. 1) in operation 1103.

According to various embodiments of the disclosure, the core network 701 may transmit a signal (for example, a paging signal) according to the received location information request to the IoT UE 310 in operation 1105. According to various embodiments of the disclosure, the IoT UE 310 (for example, the processor 210) may monitor the paging signal according to the DRX cycle in operation 1107.

According to various embodiments of the disclosure, the IoT UE 310 may ignore the received paging signal of operation 1105 according to the response skip mode. When a predetermined time (first time) from the time point at which the paging signal of operation 1105 is transmitted has expired in operation 1105a, the core network 701 may transmit a time expiration notification message to the IoT server 320 in operation 1109.

According to various embodiments of the disclosure, the IoT server 320 (for example, the processor 225) may transmit the location information and/or time information stored in operation 1101 to the client 330 on the basis of reception of the time expiration notification message in operation 1113. According to various embodiments of the disclosure, the time information stored in the IoT server 320 may be transmitted to the client 330 in operation 1113.

According to various embodiments of the disclosure, when a predetermined time (second time) from the time point at which the paging signal is monitored in operation 1107 has expired in operation, the IoT UE 310 may switch the operation mode from the response skip mode to the response mode regardless of the number of detections (or receptions) of the paging signal. According to various embodiments of the disclosure, before the second time expires in operation 1107a, the IoT UE 310 may detect a paging signal according to a location information request in 1115 in operation 1117. In order to detect the paging signal, the IoT UE 310 may monitor the paging signal in operation 1119. According to various embodiments of the disclosure, since the IoT UE 310 detects the paging signal of operation 1117 before the second time expires in operation 1107a, the paging signal may be ignored. When a predetermined time (first time) has expired after the paging signal is transmitted in operation 1117a, the core network 701 may transmit a time expiration notification message to the IoT server 320 in operation 1121. Upon receiving the time expiration notification message, the IoT server 320 may transmit the location information and/or time information stored in operation 1101 to the client in operation 1123. According to various embodiments of the disclosure, the IoT server 320 may transmit the time information to the client 330 in operation 1123. According to various embodiments of the disclosure, after the second time has expired in operation 1107a, the IoT UE 310 may configure (or switch) the operation mode to be the response mode in operation 1125. The description made with reference to FIG. 7B about the response mode may be equally applied to operations after operation 1125, that is, operations 1127 to 1139. According to various embodiments of the disclosure, through the function/operation for switching to the response mode, the state can be distinguished from a power-off state of the IoT UE 310 by the user of the client 330, and thus user convenience can be increased.

Referring to FIG. 11C, the IoT server 320 may store location information and/or time information transmitted from the IoT UE 310 since a specific time point in the past in a memory (for example, the memory 215 of FIG. 2B) in operation 1150.

According to various embodiments of the disclosure, the IoT UE 310 may configure the operation mode to be the monitoring skip mode in operation 1152. According to various embodiments of the disclosure, the IoT UE 310 may not monitor the paging signal even during a time for monitoring the paging signal (for example, a paging time window (PTW) interval or an on-duration interval) by the monitoring skip mode. The term "first time" illustrated in FIG. 11C may be a maximum response latency time designated to receive a response from the IoT UE 310. The term "second time" illustrated in FIG. 11C may be a maximum maintenance time of the monitoring skip mode designated to switch to the response mode after the IoT UE 310 is configured as the monitoring skip mode. According to various embodiments of the disclosure, the description made with reference to FIG. 8C about the monitoring skip mode may be equally applied to operations 1154 to 1168.

According to various embodiments of the disclosure, when a predetermined time (second time) expires in operation 1152a after the IoT UE 310 is configured as the monitoring skip mode, the IoT UE 310 may switch to operation mode to the response mode. According to various embodiments of the disclosure, the description made with reference to FIG. 7B about response mode may be equally applied to operations 1172 to 1184. According to various embodiments of the disclosure, through switching to the response mode, the state can be distinguished from a power-off state of the IoT UE 310 by the user of the client, and thus user convenience can be increased.

Figure 12A:
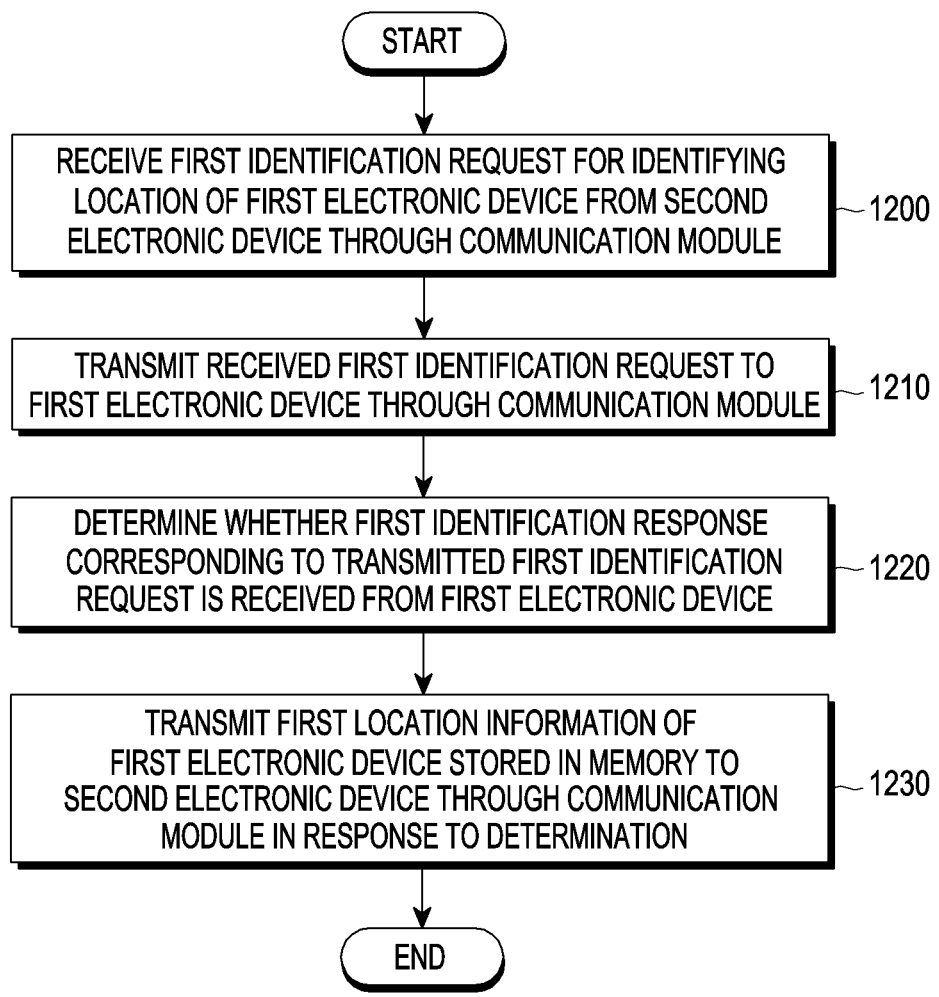
FIGS. 12A and 12B illustrate methods of operating the electronic device according to various embodiments.
Figure 12B:
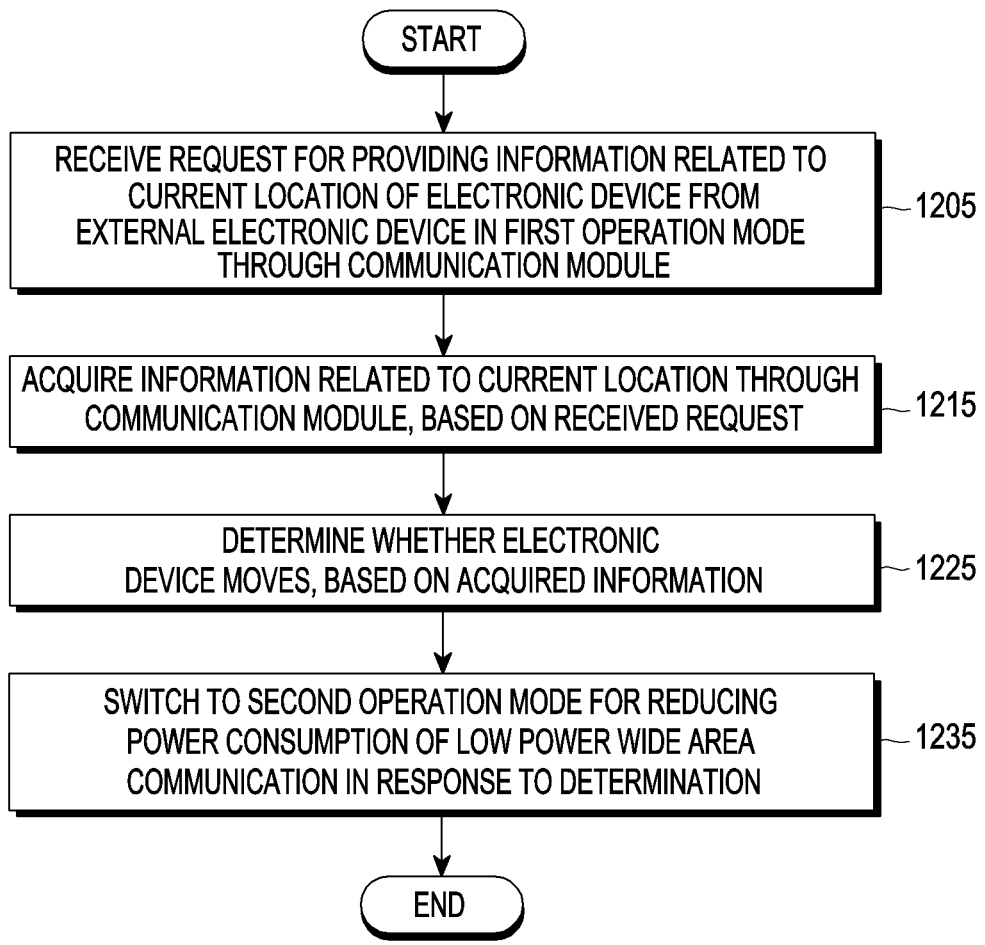

FIGS. 12A and 12B illustrate methods of operating the electronic device according to various embodiments.

According to various embodiments of the disclosure, operations 1200 to 1230 illustrated in FIG. 12A may be executed through one (for example, the processor 225) of the elements included in the electronic device (for example, the IoT server 320).

Referring to FIG. 12A, in the method of operating the electronic device according to various embodiments of the disclosure, the electronic device may receive a first identification request for identifying the location of a first electronic device from a second electronic device through a communication module (for example, the communication module 235 of FIG. 2B) in operation 1200.

In the method of operating the electronic device according to various embodiments of the disclosure, the electronic device may transmit the received first identification request to the first electronic device through the communication module (for example, the communication module 235 of FIG. 2B) in operation 1210.

In the method of operating the electronic device according to various embodiments of the disclosure, the electronic device may determine whether a first identification response corresponding to the transmitted first identification request is received from the first electronic device in operation 1220.

In the method of operating the electronic device according to various embodiments of the disclosure, the electronic device may transmit first location information of the first electronic device stored in a memory (for example, the memory 215) to the second electronic device through the communication module (for example, the communication module 235 of FIG. 2B) in response to the determination in operation 1230.

According to various embodiments of the disclosure, operations 1205 to 1235 illustrated in FIG. 12B may be executed through one (for example, the processor 210) of the elements included in the electronic device (for example, the IoT UE 310).

Referring to FIG. 12B, in the method of operating the electronic device according to various embodiments of the disclosure, the electronic device may receive a request for transmitting information related to the current location of the electronic device from an external electronic device through a communication module (for example, the communication module 220 of FIG. 2A) in a first operation mode in operation 1205.

In the method of operating the electronic device according to various embodiments of the disclosure, the electronic device may acquire the information related to the current location on the basis of the received request through a communication module (for example, the communication module 220 of FIG. 2A) and/or a sensor device (for example, the sensor module 430) in operation 1215.

In the method of operating the electronic device according to various embodiments of the disclosure, the electronic device may determine whether the electronic device moves on the basis of the acquired information in operation 1225.

In the method of operating the electronic device according to various embodiments of the disclosure, the electronic device may switch to a second operation mode for saving power consumption of low power wide area communication in response to the determination in operation 1235.

Figure 13A:
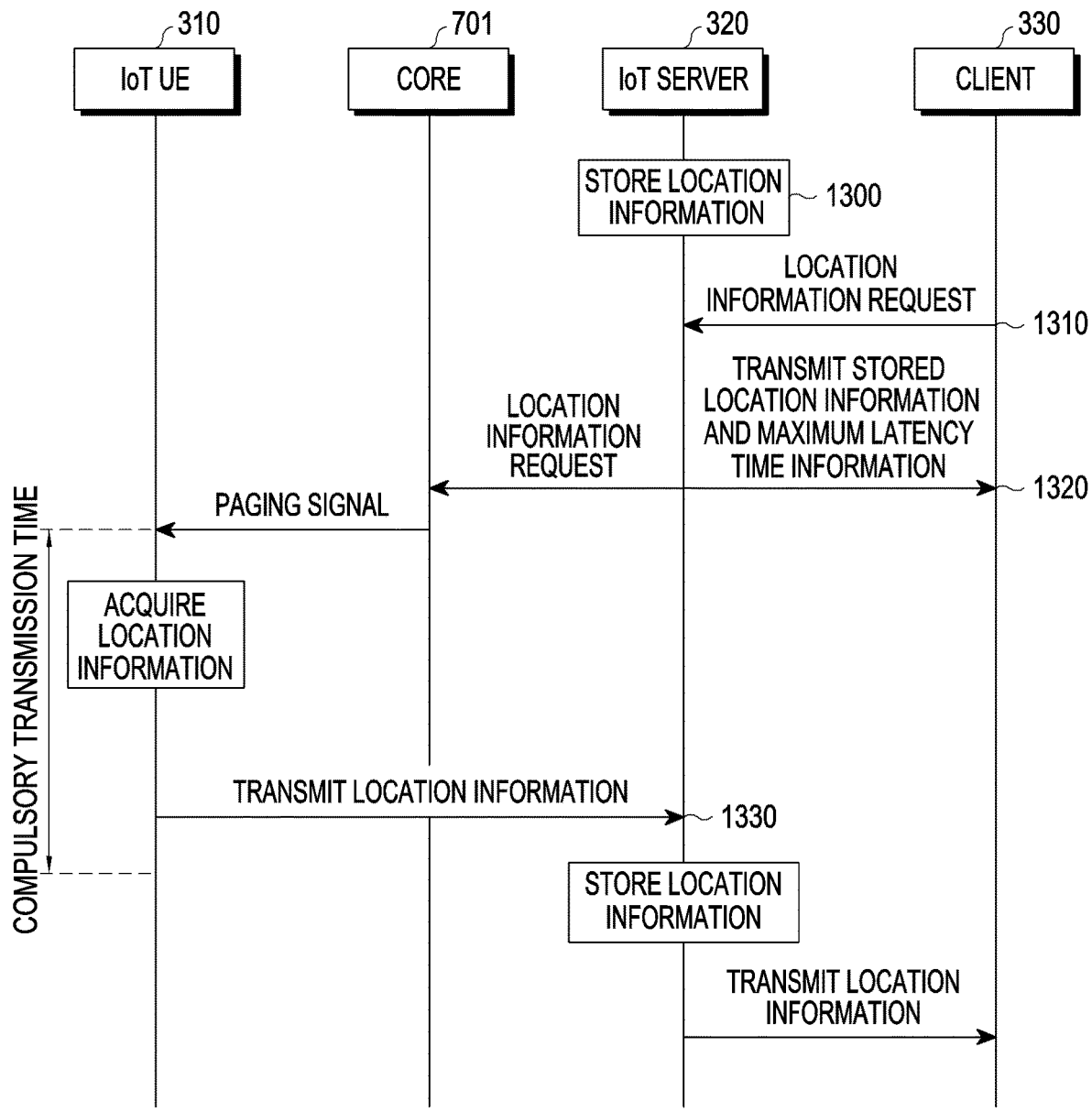
FIGS. 13A and 13B illustrate an operation in which the electronic device transmits an expected time point at which location information is transmitted according to various embodiments.
Figure 13B:
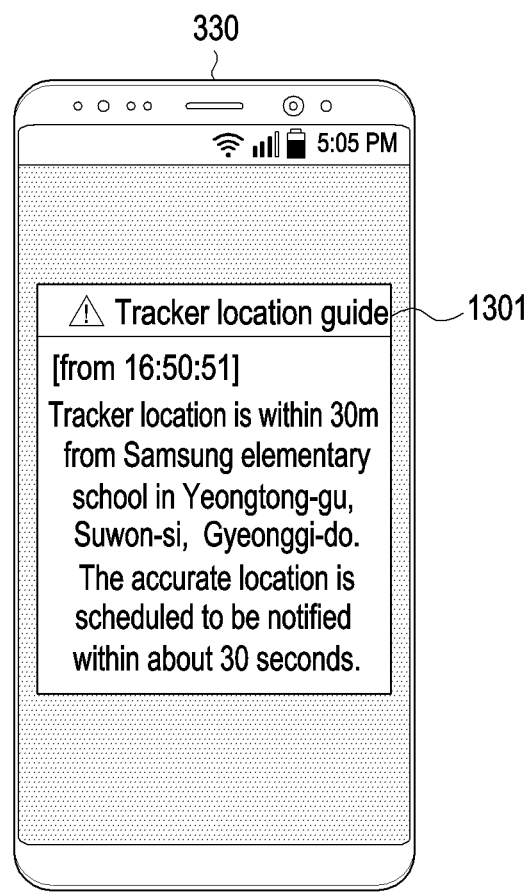

FIGS. 13A and 13B illustrate an operation in which the electronic device transmits an expected time point at which location information is transmitted according to various embodiments.

Referring to FIG. 13A, the IoT server 320 may store location information transmitted from the IoT UE 310 since a specific time point in the past in a memory (for example, the memory 215) in operation 1300.

According to various embodiments of the disclosure, the client 330 may transmit a request for location information of the IoT UE 310 to the IoT server 320 through a communication module (for example, the communication module 190 of FIG. 1) in operation 1310.

According to various embodiments of the disclosure, upon receiving the location information request, the IoT server 320 may transmit the latest location information among the location information of the IoT UE 310 stored in the IoT server 320 to the client in operation 1300. According to various embodiments of the disclosure, the time information may be transmitted along with the latest location information. According to various embodiments of the disclosure, information on a maximum latency time of the current location information of the IoT UE 310 may be transmitted to the client 330. The client 330 may receive the information on the maximum latency time and display a notification message 1301 on the client 330 as illustrated in FIG. 13B. The information on the maximum latency time may be determined according to a predetermined compulsory transmission time (for example, 30 seconds). The compulsory transmission time according to various embodiments of the disclosure may be a maximum time during which, when the IoT UE 310 detects the paging signal, the IoT UE 310 should acquire current location information and/or time information of the IoT UE 310 and transmit the same to the IoT server 320. In FIG. 13B, the compulsory transmission time is 30 seconds by way of example. According to various embodiments of the disclosure, the compulsory transmission time may be configured to be shorter than the maximum latency time in consideration of a time for transmission from the IoT UE 310. For example, the compulsory transmission time may be configured as 25 seconds, and the maximum latency time displayed on the client 330 may be configured as 30 seconds. Information on the compulsory transmission time and/or information on the maximum latency time may be stored in the IoT UE 310 or received by the IoT UE 310 from the core network 701. Further, the information on the compulsory transmission time may be stored in the IoT server 320. According to various embodiments of the disclosure, before the compulsory transmission time expires, the IoT UE 310 may transmit the acquired location information and/or time information to the IoT server 320 through the core network 701 in operation 1330. In addition, at least some of the description made in the disclosure may be equally applied to other parts illustrated in FIG. 13A.

Figure 14:
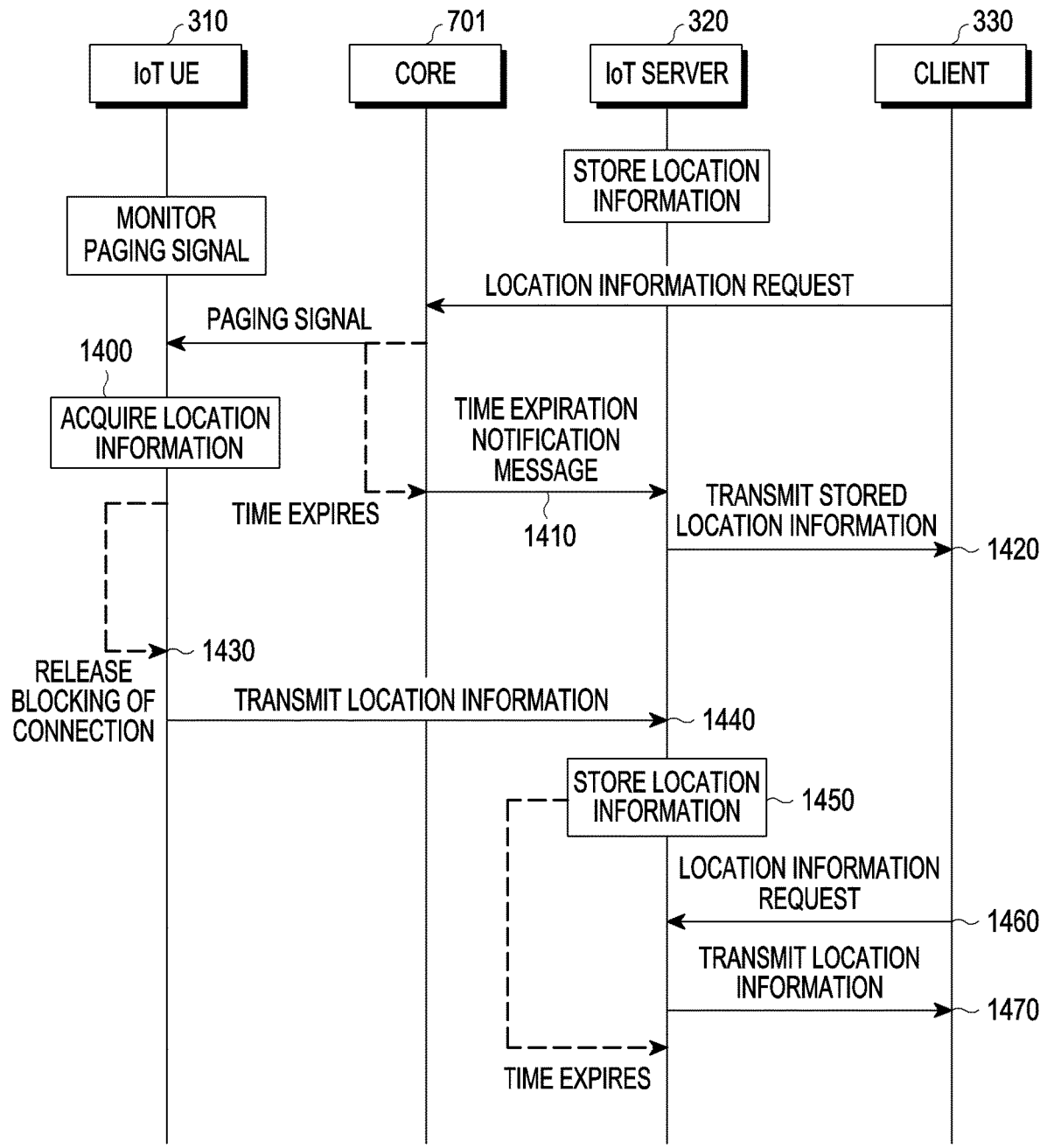
FIG. 14 illustrates an operation in the case in which a connection between an electronic device and a network device is blocked according to various embodiments.

FIG. 14 illustrates an operation in the case in which the connection between the electronic device and the network is released according to various embodiments.

Referring to FIG. 14, the IoT UE 310 may acquire location information according to reception of a paging signal in operation 1400. According to an embodiment, after the IoT UE 310 acquires location information, the acquired location information may not be transmitted to the IoT server 320 for a predetermined time due to a change in a communication environment such as an unstable state of the network. Accordingly, the core network 701 cannot receive a response to the paging signal from the IoT UE 310 and thus may transmit a time expiration notification message to the IoT server 320 in operation 1410. That is, even though the IoT UE 310 acquires the current location information and/or time information, past location information stored in the IoT server 320 cannot be transmitted to the client 330 due to the unstable state of the network. According to various embodiments of the disclosure, when the communication connection is released due to the unstable state of the network in operation 1430, the IoT UE 310 may transmit the acquired location information and/or time information to the IoT server 320 through the core network 701 in operation 1430. The IoT server 320 may store the acquired location information and/or time information in operation 1450. Thereafter, when the IoT server 320 receives a request for location information of the IoT UE 310 from the client 330 within a predetermined time in operation 1460, the IoT server 320 may transmit location information stored in the IoT server 320 to the client 330 in operation 1470.

According to at least some embodiments of the disclosure, for convenience of description, when specific information is transmitted to a second device via (in other words, through) a first device, the mention of the first device may be omitted, and transmission of the specific information to the second device may be briefly mentioned.

The operation according to various embodiments of the disclosure may be equally applied to the case in which the IoT UE 310 is configured to report the current location information of the IoT UE 310 to at least one electronic device of the core network 701, the IoT server 320, and the client 330 according to a predetermined report period, that is, the case in which there is no request for location information from the client 330. The request for information from the client 320, described in the disclosure, is only an example for describing various embodiments of the disclosure.

In the disclosure, the IoT UE 310 is described as, for example, a device capable of acquiring location information and transmitting the acquired location information to the client 330 connected to the IoT UE 310. However, various embodiments of the disclosure may be applied to the case in which the IoT UE 310 is a device performing a function/operation such as reading the gas meter. For example, the sensor module (for example, the sensor module 230) may include a gas sensor, and may ignore a request for transmitting gas information when a change in gas detected by the gas sensor for a predetermined time is equal to or smaller than a threshold value even though the request for transmitting the gas information is received from the client 330. In this case, the IoT server 320 connected to the IoT UE 310 may transmit the latest gas information stored in the IoT server 320 (for example, density of carbon dioxide and density of methane gas detected by the IoT UE 310, and a time point at which gas information is acquired) to the client. However, the gas sensor is only an example, and the IoT UE 310 according to various embodiments of the disclosure may include sensor modules and/or electronic devices performing various operations.

A system according to various embodiments of the disclosure may include a communication module, a processor operatively connected to the communication module, and a memory operatively connected to the processor, wherein the memory may include instructions causing the processor to, when executed, receive a first identification request for identifying a location of a first electronic device from a second electronic device, transmit the received first identification request to the first electronic device through the communication module, determine whether a first identification response corresponding to the transmitted first identification request is received from the first electronic device, and transmit first location information of the first electronic device stored in the memory to the second electronic device through the communication module on the basis of the determination, and the first location information may include location information transmitted from the first electronic device according to a second identification request received from the second electronic device before a time point at which the first identification request is received.

According to various embodiments of the disclosure, the instructions for transmitting the first location information to the second electronic device may include instructions for transmitting the first location information to the second electronic device when a second identification response including a time expiration notification message is received from a network device through the communication module on the basis of the transmitted first identification request.

According to various embodiments of the disclosure, the first identification response may include location information of the first electronic device corresponding to the first identification request and time information at a time point at which the location information is acquired.

According to various embodiments of the disclosure, the memory may further include instructions causing the processor to, when the first identification response is received from the first electronic device, transmit the location information of the first electronic device included in the received first identification response to the second electronic device.

According to various embodiments of the disclosure, the first electronic device may support a narrowband-IoT network.

According to various embodiments of the disclosure, the electronic device may further include instructions for transmitting together the first location information and information on an expected time point at which location information is received according to the first identification request to the first electronic device through the communication module before the first identification request is transmitted to the first electronic device after the first identification request is received.

According to various embodiments of the disclosure, the electronic device may further include instructions for, when the first identification response is received after a second identification response including a time expiration notification message is received from a network device through the communication module on the basis of the transmitted first identification request, storing the received first identification response and, when the first identification request is received again from the first electronic device through the communication module, transmitting location information according to the stored first identification response.

A computer-readable recording medium storing instructions configured to cause a processor to perform at least one operation is provided. The at least one operation may include an operation of receiving a first identification request for identifying a location of a first electronic device from a second electronic device, an operation of transmitting the received first identification request to the first electronic device, an operation of determining whether a first identification response corresponding to the transmitted first identification request is received from the first electronic device, and an operation of transmitting first location information of the first electronic device stored in the memory to the second electronic device on the basis of the determination, wherein the first location information may include location information transmitted from the first electronic device according to a second identification request received from the second electronic device before a time point at which the first identification request is received.

An electronic device according to various embodiments of the disclosure may include a housing, a communication module located within the housing, a processor located within the housing and connected to the communication module to be operable, and at least one memory located within the housing and connected to the processor to be operable, wherein the memory may include instructions causing the processor to, when executed, receive a request for providing information related to a current location of the electronic device from an external electronic device in a first operation mode through the communication module by the electronic device, acquire the information related to the current location through the communication module on the basis of the received request, determine whether the electronic device moves on the basis of the acquired information, and switch to a second operation mode on the basis of determination of whether the electronic device moves.

According to various embodiments of the disclosure, the instructions according to the first operation mode may include instructions for transmitting the acquired information to the external electronic device according to the request for providing the information related to the current location through the communication module.

According to various embodiments of the disclosure, when it is determined that the electronic device has not moved on the basis of the determination, the instructions according to the second operation mode may include instructions for not transmitting a response to the request for providing the information related to the current location to the external electronic device.

According to various embodiments of the disclosure, when it is determined that the electronic device has not moved on the basis of the determination, the instructions according to the second operation mode may include instructions for not monitoring the request for providing the information related to the current location.

According to various embodiments of the disclosure, the instructions for determining whether the electronic device moves may include instructions for determining that the electronic device moves when a difference between the current location of the electronic device and a location according to lastly acquired location information before a time point at which the electronic device receives the request for providing the location information is larger than a threshold distance.

According to various embodiments of the disclosure, the electronic device may further include instructions for, when a predetermined time passes after the switching to the second operation mode, switching to the first operation mode and transmitting the information related to the current location to the external electronic device according to the request for providing the information related to the current location of the electronic device.

According to various embodiments of the disclosure, the electronic device may further include instructions for, when the request for providing the information related to the current location of the electronic device is received a predetermined number of times after the switching to the second operation mode, switching to the first operation mode and transmitting the information related to the current location to the external electronic device according to the request for providing the information related to the current location of the electronic device through the communication module.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium.

Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A system comprising:
a communication module;
a processor operatively connected to the communication module; and
a memory operatively connected to the processor,
wherein the memory includes instructions that, when executed, cause the processor to:
receive a first identification request for identifying a location of a first electronic device from a second electronic device through the communication module,
transmit the received first identification request to the first electronic device through the communication module,
determine whether a first identification response corresponding to the transmitted first identification request is received from the first electronic device, and
transmit first location information of the first electronic device stored in the memory to the second electronic device through the communication module, based on the determination,
wherein the first location information includes location information transmitted from the first electronic device according to a second identification request received from the second electronic device before a time point at which the first identification request is received.

2. The system of claim 1, wherein the memory includes instructions causing the processor to
transmit the first location information to the second electronic device when a second identification response including a time expiration notification message is received from a network device through the communication module, based on the transmitted first identification request,
wherein the network device is configured to communicate with the system through the communication module.

3. The system of claim 1, wherein the first identification response includes location information of the first electronic device corresponding to the first identification request and time information at a time point at which the location information is acquired.

4. The system of claim 3, wherein the memory further includes instructions causing the processor to, when the first identification response is received from the first electronic device, transmit the location information of the first electronic device included in the received first identification response to the second electronic device.

5. The system of claim 1, wherein the first electronic device supports a narrowband-IoT network.

6. The system of claim 1, wherein the memory includes instructions causing the processor to transmit together the first location information and information on an expected time point at which location information is received according to the first identification request to the first electronic device through the communication module before the first identification request is transmitted to the first electronic device after the first identification request is received.

7. The system of claim 1, wherein the memory includes instructions causing the processor to:
when the first identification response is received after a second identification response including a time expiration notification message is received from a network device through the communication module, based on the transmitted first identification request, store the received first identification response, and when the first identification request is received again from the second electronic device through the communication module, and transmit location information according to the stored first identification response to the second electronic device.

8. A non-transitory computer-readable recording medium storing instructions configured to cause a processor to perform at least one operation, the at least one operation comprising:
- receiving a first identification request for identifying a location of a first electronic device from a second electronic device;
- transmitting the received first identification request to the first electronic device;
- determining whether a first identification response corresponding to the transmitted first identification request is received from the first electronic device; and
- transmitting first location information of the first electronic device to the second electronic device, based on the determination,
- wherein the first location information includes location information transmitted from the first electronic device according to a second identification request received from the second electronic device before a time point at which the first identification request is received.

9. The non-transitory computer-readable recording medium of claim 8, wherein the transmitting of the first location information to the second electronic device comprises transmitting the first location information to the second electronic device when a second identification response including a time expiration notification message is received from a network device, based on the transmitted first identification request.

10. The non-transitory computer-readable recording medium of claim 8, wherein the first identification response includes location information of the first electronic device corresponding to the first identification request.

11. The non-transitory computer-readable recording medium of claim 8, wherein the at least one operation further comprises:
- when the first identification response is received from the first electronic device, transmitting the location information of the first electronic device included in the received first identification response to the second electronic device.

12. The non-transitory computer-readable recording medium of claim 8, wherein the at least one operation further comprises transmitting together the first location information and information on an expected time point at which location information is received according to the first identification request to the first electronic device before the first identification request is transmitted to the first electronic device after the first identification request is received.

13. The non-transitory computer-readable recording medium of claim 8, wherein the at least one operation further comprises:
- when the first identification response is received after a second identification response including a time expiration notification message is received from a network device, based on the transmitted first identification request, storing the received first identification response; and
- when the first identification request is received again from the second electronic device, transmitting location information according to the stored first identification response to the second electronic device.

14. An electronic device comprising:
a housing:
a communication module located within the housing;
a processor located within the housing and connected to the communication module to be operable; and
at least one memory located within the housing and connected to the processor to be operable,
wherein the memory includes instructions causing the processor to, when executed, receive a request for providing information related to a current location of the electronic device from an external electronic device in a first operation mode through the communication module by the electronic device, acquire the information related to the current location through the communication module, based on the received request, determine whether the electronic device moves, based on the acquired information, and switch to a second operation mode for reducing power consumption in low power wide area communication, based on determination of whether the electronic device moves.

15. The electronic device of claim 14, wherein the memory includes instructions causing the processor to transmit the acquired information to the external electronic device according to the request for providing the information related to the current location through the communication module.

16. The electronic device of claim 14, wherein, the memory further includes instructions causing the processor to,
when it is determined that the electronic device has not moved based on the determination, control not to transmit a response to the request for providing the information related to the current location to the external electronic device.

17. The electronic device of claim 14, wherein, the memory further includes instructions causing the processor to, when it is determined that the electronic device has not moved based on the determination, control not to monitor the request for providing the information related to the current location.

18. The electronic device of claim 14, wherein the memory further includes instructions causing the processor to determine that the electronic device moves when a difference between the current location of the electronic device and a location according to lastly acquired location information before a time point at which the electronic device receives the request for providing the location information is larger than a threshold distance.

19. The electronic device of claim 14, wherein the memory further includes instructions causing the processor to,
when a predetermined time passes after the switching to the second operation mode, switch to the first operation mode and transmit the information related to the current location to the external electronic device according to the request for providing the information related to the current location of the electronic device through the communication module.

20. The electronic device of claim 14, wherein the memory further includes instructions causing the processor to,
when the request for providing the information related to the current location of the electronic device is received a predetermined number of times after the switching to the second operation mode, switch to the first operation mode and transmit the information related to the current location to the external electronic device according to the request for providing the information related to the current location of the electronic device through the communication module.

\* \* \* \* \*